United States Patent
Yang et al.

(10) Patent No.: US 12,522,683 B2
(45) Date of Patent: Jan. 13, 2026

(54) AMPHIPHILIC COPOLYMER WITH ZWITTERIONIC AND FLUORINATED MOIETIES

(71) Applicant: Cornell University, Ithaca, NY (US)

(72) Inventors: Rong Yang, Ithaca, NY (US); Trevor Franklin, Ithaca, NY (US)

(73) Assignee: CORNELL UNIVERSITY, Ithaca, NY (US)

( * ) Notice: Subject to any disclaimer, the term of this patent is extended or adjusted under 35 U.S.C. 154(b) by 33 days.

(21) Appl. No.: 17/454,763

(22) Filed: Nov. 12, 2021

(65) Prior Publication Data

US 2022/0332869 A1      Oct. 20, 2022

Related U.S. Application Data

(60) Provisional application No. 63/114,255, filed on Nov. 16, 2020.

(51) Int. Cl.
  *C08F 226/06*     (2006.01)
  *C08F 212/36*     (2006.01)
  (Continued)

(52) U.S. Cl.
  CPC .......... *C08F 226/06* (2013.01); *C08F 212/36* (2013.01); *C08F 220/22* (2013.01);
  (Continued)

(58) Field of Classification Search
  CPC ...... C08F 226/06; C08F 26/06; C08F 220/24; C08F 220/22; C08F 20/22; C08F 20/24;
  (Continued)

(56) References Cited

U.S. PATENT DOCUMENTS 4,098,654 A  *  7/1978  Helle ............... C25D 15/02
                                                    204/488
6,153,269 A     11/2000  Gleason et al.
(Continued)

FOREIGN PATENT DOCUMENTS

CN      112500726 A      3/2021
JP       62151599 A  *  7/1987  ............ C25D 15/02
(Continued)

OTHER PUBLICATIONS

Chou, et al, "Surface zwitterionization on versatile hydrophobic interfaces via a combined copolymerization/self-assembling process" J. Mater. Chem. B, 2018, 6, 4909-4919.
(Continued)

*Primary Examiner* — Joseph S Del Sole
*Assistant Examiner* — David L Miller
(74) *Attorney, Agent, or Firm* — HESLIN ROTHENBERG FARLEY & MESITI P.C.

(57) ABSTRACT

Provided are amphiphilic copolymers that include repeat units of formulas $[Z]_m$ and $[P]_n$, wherein Z is a zwitterionic structural unit including at least one pendant heteroaromatic moiety, the heteroaromatic moiety containing a positively charged quaternary nitrogen atom (e.g., a pyridine ring), and wherein at least one negatively charged functional moiety is linked to the heteroaromatic moiety directly or through a linker, wherein the linker, where present, is an optionally substituted alkyl linker; P is a structural unit including a hydrophobic moiety, the hydrophobic moiety being a linear, branched, or cyclic fluorine-substituted $C_1$-$C_{20}$ moiety; m is an integer that is ≥1; and n is an integer that is ≥1.

22 Claims, 21 Drawing Sheets

(51) Int. Cl.

| | |
|---|---|
| *C08F 220/22* | (2006.01) |
| *C08F 220/24* | (2006.01) |
| *C09D 5/16* | (2006.01) |
| *C08F 20/22* | (2006.01) |
| *C08F 20/24* | (2006.01) |
| *C08F 22/18* | (2006.01) |
| *C08F 26/06* | (2006.01) |
| *C08F 222/18* | (2006.01) |

(52) U.S. Cl.
CPC .......... *C08F 220/24* (2013.01); *C09D 5/1637* (2013.01); *C08F 20/22* (2013.01); *C08F 20/24* (2013.01); *C08F 22/18* (2013.01); *C08F 26/06* (2013.01); *C08F 222/18* (2013.01)

(58) Field of Classification Search
CPC .... C08F 222/18; C08F 222/185; C08F 22/18; C08F 218/20; C08F 18/20
See application file for complete search history.

(56) References Cited

U.S. PATENT DOCUMENTS

| | | | |
|---|---|---|---|
| 7,431,969 | B2 | 10/2008 | Gleason et al. |
| 7,563,734 | B2 | 7/2009 | Gleason et al. |
| 8,629,210 | B2 | 1/2014 | Webster et al. |
| 8,820,257 | B2 | 9/2014 | Chisholm et al. |
| 9,598,598 | B2 | 3/2017 | Gleason et al. |
| 9,884,341 | B2 | 2/2018 | Gleason et al. |
| 2006/0083854 | A1 | 4/2006 | Ober et al. |
| 2008/0237133 | A1 | 10/2008 | Dale et al. |
| 2010/0196986 | A1 | 8/2010 | Laursen et al. |
| 2010/0210745 | A1 | 8/2010 | Mcdaniel et al. |
| 2014/0083931 | A1 | 3/2014 | Chang et al. |
| 2014/0299538 | A1 | 10/2014 | Gleason et al. |
| 2015/0283307 | A1 | 10/2015 | Smith et al. |
| 2016/0074816 | A1 | 3/2016 | Ginic-Markovic et al. |
| 2016/0303523 | A1* | 10/2016 | Alexiou ................ C08F 220/48 |
| 2018/0009001 | A1 | 1/2018 | Paxson et al. |
| 2019/0022594 | A1 | 1/2019 | Wang et al. |
| 2021/0002493 | A1 | 1/2021 | Lawin et al. |

FOREIGN PATENT DOCUMENTS

| | | | | |
|---|---|---|---|---|
| WO | 2013007354 | A1 | 1/2013 | |
| WO | 2014165850 | A2 | 10/2014 | |
| WO | WO-2015070004 | A1 * | 5/2015 | ............. B01D 69/02 |
| WO | WO-2018085057 | A1 * | 5/2018 | ......... B01D 67/0011 |
| WO | 2020186134 | A1 | 9/2020 | |
| WO | WO-2020231797 | A1 * | 11/2020 | ............. B01D 69/02 |
| WO | 2021070055 | A1 | 4/2021 | |

OTHER PUBLICATIONS

Lam, et al, "Structurally Nanoengineered Peptide Polymers for Combating Multidrug-Resistant Bacteria" Department of Chemical & Biomolecular Engineering, 2016, The University of Melbourne.
Krishnan, et al, "Anitbacterial Coatings Based on Quaternized Poly(4-vinylpyridine) Block Copolymers" Polym. Mater. Sci. Eng. Preprints (2004), 91, 814-815.
Wu, et al, "P4VP Modified Zwitterionic Polymer for the Preparation of Antifouling Functionalized Surfaces" State Key Laboratory of Molecular Engineering of Polymers, Department of Macromolecular Science, Fudan University, Nanomaterials 2019, 9, 706.
Wu, et al, "Novel antifouling polysulfone matrix membrane modified with zwitterionic polymer" Journal of Saudi Chemical Society (2021) 25, 101281.
Yang et al., Molecular fouling resistance of zwitterionic and amphiphilic initiated chemically vapor-deposited (iCVD) thin films (Abstract) (2014) Journal of Biomaterials Science, Polymer Edition, 25:14-15, 1687-1702.
Seetho et al., Facile Synthesis of a Phosphorylcholine-Based Zwitterionic Amphiphilic Copolymer for Anti-Biofouling Coatings (Abstract), ACS Macro Lett. 2015, 4, 5, 505-510.
Perrotta et al., Growth Regimes of Poly(perfluorodecyl acrylate) Thin Films by Initiated Chemical Vapor Deposition, Macromolecules 2018 51 (15), 5694-5703.
Petruczok et al., Controllable Cross-Linking of Vapor-Deposited Polymer Thin Films and Impact on Material Properties (Abstract) Macromolecules 2013, 46, 5, 1832-1840.
Yang et al., Surface-Tethered Zwitterionic Ultrathin Antifouling Coatings on Reverse Osmosis Membranes by Initiated Chemical Vapor Deposition (Abstract), Chemistry of Materials 2011 23 (5), 1263-1272.
Coclite et al., Super-Hydrophobic and Oloephobic Crystalline Coatings by Initiated Chemical Vapor Deposition, Physics Procedia, vol. 46, 2013, pp. 56-61.
Lin et al., Ultralow Fouling and Functionalizable Surface Chemistry Based on Zwitterionic Carboxybetaine Random Copolymers. Langmuir. 2019;35(5):1544-1551.

* cited by examiner 0.851 ± 0.277 nm 0.513 ± 0.074 nm 0.309 ± 0.056 nm

AMPHIPHILIC COPOLYMER WITH ZWITTERIONIC AND FLUORINATED MOIETIES

CROSS-REFERENCE TO RELATED APPLICATIONS

This application claims priority to U.S. Provisional Patent Application No. 63/114,255, filed Nov. 16, 2020, the contents of which are hereby incorporated by reference herein in their entirety.

GOVERNMENT LICENSE RIGHTS

This invention was made with government support under N00014-20-1-2418 awarded by the Office of Naval Research, DGE-1650441 awarded by the National Science Foundation, and NIHDC016644 awarded by the National Institutes of Health. The United States Government has certain rights in the invention.

FIELD OF THE INVENTION

This invention relates to, inter alia, amphiphilic copolymers with zwitterionic and fluorinated moieties that have antifouling properties, to compositions comprising the copolymers, to methods of preparing the copolymers, and to methods employing the copolymers.

BACKGROUND

Biofouling is a critical problem that limits a broad range of areas including water desalination, marine transportation, and food manufacturing. The term refers to the accumulation of organic buildup and microorganisms on a submerged surface, which leads to long-standing problems including severe clogging of pipelines and filters, infection due to contamination of medical devices, reduction of membrane performance, and deterioration of ship efficiency. Biofouling is discussed, for example, in WO/2014/165850.

Biofouling in water purification and marine transportation further reduces process efficiency, driving up the energy consumption and greenhouse gas emission while causing pollution. To mitigate biofouling, two general strategies have been explored: incorporation and sustained release of biocides and antifouling coatings to repel the adhesion. The former strategy involves biocides, which are commonly antimicrobial agents. One of the first antifouling paints contains liquid tributyltin, which had 0% fouling for up to 49 months. However, tributyltin has long been prohibited due to its strong ecotoxicity, which was believed to cause damage to the habitats of prosobranch species in Europe. The current mainstay antifouling ship hull paint contains copper/zinc, which nevertheless have recently been shown to be harmful to aquatic life such as mussels and macroalga. Furthermore, effectiveness of the biocide-based antifouling strategies has been declining steadily due to the rapid development of antimicrobial resistance.

To overcome the ecotoxicity issues of biocide-based antifouling strategies, antifouling coatings and fouling-release coatings have been developed. Hydrophilic antifouling coatings form a strong hydration layer via hydrogen bonding and/or electrostatic interactions with water molecules to create an enthalpic barrier and thereby prevent fouling. Furthermore, some polymer brush-based antifouling coatings, such as poly(ethylene oxide) [PEO] brushes, have been hypothesized to repel foulants via entropic effects (in addition to the aforementioned enthalpic penalty), e.g., the resistance to polymer chain compression that could result from the adhesion of foulants. In the past decade, zwitterionic polymers, a class of hydrophilic materials with extremely strong hydration and hence excellent antifouling performance (due to the electrostatic interactions between their charged groups and induced dipole in water molecules), have been the focus of many antifouling studies.

Even though hydrophilic coatings appear to be environmentally friendly, they have been demonstrated to be ineffective at the solid-liquid-air interface, the location most prone to biofilm formation by motile bacteria.

Thus, a need exists for improved antifouling materials and in particular for materials that are not as deleterious to the environment.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

In this specification, where a document, act or item of knowledge is referred to or discussed, this reference or discussion is not an admission that the document, act or item of knowledge or any combination thereof was, at the priority date, publicly available, known to the public, part of common general knowledge, or otherwise constitutes prior art under the applicable statutory provisions; or is known to be relevant to an attempt to solve any problem with which this specification is concerned.

SUMMARY OF THE INVENTION

Briefly, embodiments of the present invention satisfy the need for, inter alia, improved antifouling materials.

The invention provides, inter alia, amphiphilic copolymers with zwitterionic and fluorinated moieties that have antifouling properties, as well as related compositions and methods.

Embodiments of the invention may address one or more of the problems and deficiencies discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

Certain embodiments of the presently-disclosed copolymers and related compositions and methods have several features, no single one of which is solely responsible for their desirable attributes. Without limiting the scope of the copolymers, compositions, and methods as defined by the claims that follow, their more prominent features will now be discussed briefly. After considering this discussion, and particularly after reading the section of this specification entitled "Detailed Description of the Invention," one will understand how the features of the various embodiments disclosed herein provide a number of advantages over the current state of the art. These advantages may include, without limitation, providing materials and compositions that have enhanced biofouling properties at the air-liquid-solid interface, have reduced potential environmental and/or toxicological impact, etc.

In a first aspect, the invention provides an amphiphiic copolymer comprising repeat units of formulas:

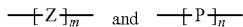

wherein
Z is a zwitterionic structural unit comprising at least one pendant heteroaromatic moiety, wherein the heteroaromatic moiety comprises a positively charged quaternary nitrogen atom, and wherein at least one negatively charged functional moiety is linked to the heteroaromatic moiety directly or through a linker, wherein the linker, where present, is an optionally substituted alkylene linker;
P is a structural unit comprising a hydrophobic moiety, said hydrophobic moiety being a linear, branched, or cyclic fluorine-substituted $C_1$-$C_{20}$ moiety:
m is an integer that is ≥1; and
n is an integer that is ≥1.

In a second aspect, the invention provides a composition comprising the copolymer according to the first aspect of the invention, including any embodiment or combination of embodiments thereof.

In a third aspect, the invention provides an article comprising the copolymer according to the first aspect of the invention or the composition according to the second aspect of the invention.

In a fourth aspect, the invention provides a method of:
decreasing, reducing, or inhibiting microorganism growth, or killing or denaturing a microorganism, or inhibiting biofilm formation; or
controlling bacteria growth on a substrate.
said method comprising applying a layer of the copolymer according to the first aspect of the invention on a substrate.

These and other objects, features, and advantages of this invention will become apparent from the following detailed description of the various aspects of the invention taken in conjunction with the accompanying drawings.

BRIEF DESCRIPTION OF THE DRAWINGS

The present invention will hereinafter be described in conjunction with the following drawing figures. The depicted figures serve to illustrate various embodiments of the invention. However, the invention is not limited to the precise arrangements and instrumentalities of the embodiments in the drawings.

(FIG. 14B) 4VP-HFBA sample with $f_{4VP}$ of 10.8% with peak fitting; (FIG. 14C) 4VP-PFOA copolymer thin films with varying $f_{4VP}$, and (FIG. 14D) 4VP-PFOA sample with $f_{4V}$ of 16.8% with peak fitting. The samples were calibrated to standard of 284.8 eV for C—C.

(FIG. 17B) PPFOA and 4VP-PFOA copolymers. (Advancing always left column, receding always right.) Note, there were no contact angles observed for 4VP. (FIG. 17C) Amphiphilic polymer thin film resistance to biofilm formation. Normalized absorbance of biofilms ($OD_{550}$ corrected by $OD_{600}$ and control glass slides) for 4VPz-DVB zwitterionic coating, and amphiphilic copolymers with different perfluorinated chain length (4VPz-HFBA, 4VPz-PFOA and 4VPz-PFDA).

DETAILED DESCRIPTION OF THE INVENTION

Figure 1:
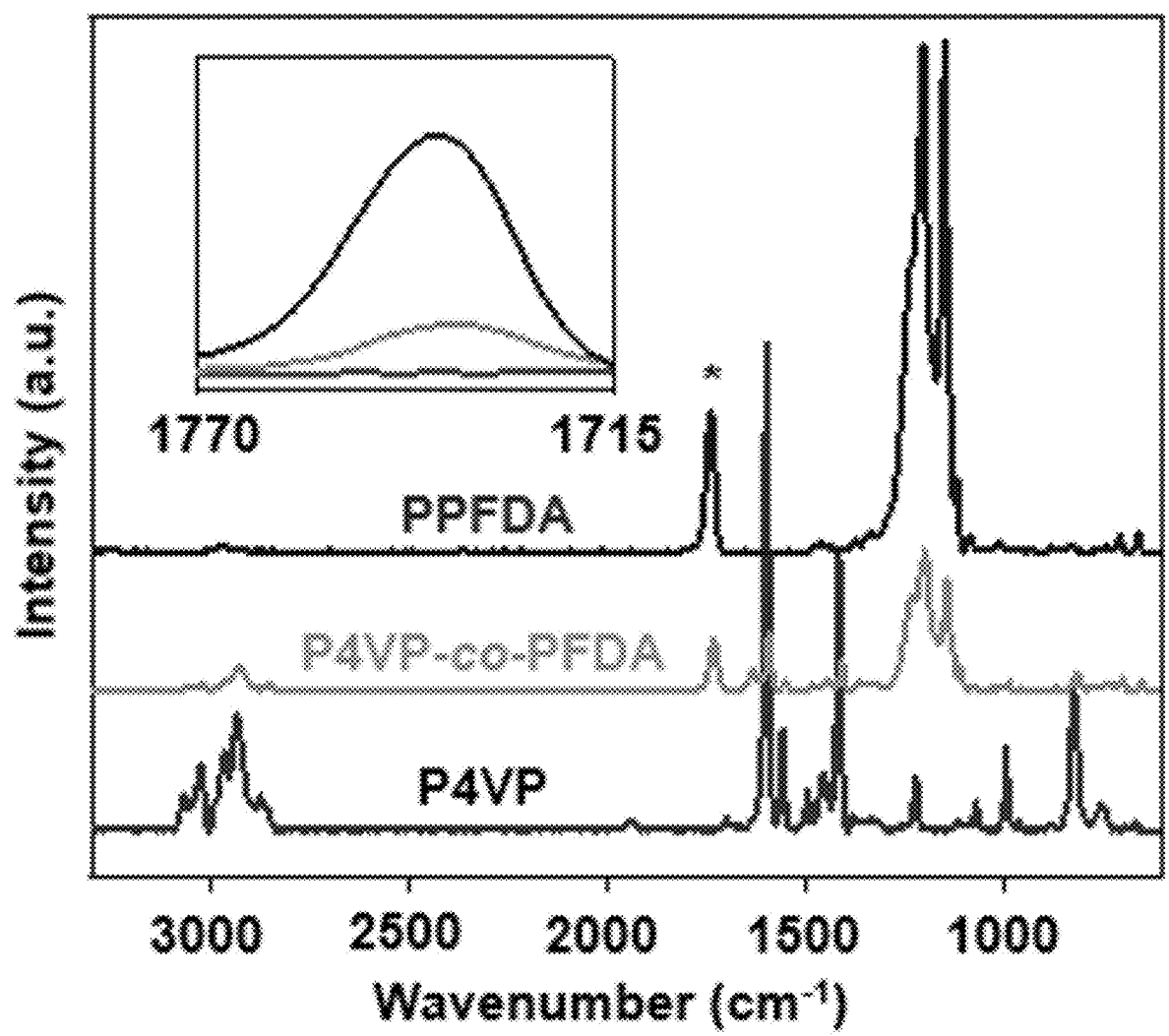
FIG. 1 shows FTIR spectra of the copolymer P4VP-co-PFDA alongside each homopolymer, P4VP and PPFDA. The inset depicts the peak at 1738 cm$^{-1}$ (*), corresponding to the stretching of C=O in PPFDA, whose area corresponds to PFDA composition in the copolymer.

The present invention relates to, inter alia, amphiphilic copolymers with zwitterionic and fluorinated moieties that have antifouling properties, as well as related compositions and methods.

Aspects of the present invention and certain features, advantages, and details thereof are explained more fully below with reference to the non-limiting embodiments discussed and illustrated herein and in the accompanying drawings. Descriptions of well-known materials, fabrication tools, processing techniques, etc., are omitted so as to not unnecessarily obscure the invention in detail. It should be understood, however, that the detailed description and the specific examples, while indicating embodiments of the invention, are given by way of illustration only, and not by way of limitation. Various substitutions, modifications, additions and/or arrangements within the spirit and/or scope of the underlying inventive concepts will be apparent to those skilled in the art from this disclosure.

Unless the context indicates otherwise, general definitions discussed herein include references to formulae and sub-formulae, sub-groups, preferences, embodiments and examples as defined herein.

The prefixes "$C_x$-$C_y$" or "$C_{x-y}$" (where x and y are integers) as used herein refer to the number of carbon atoms in a given group. Thus, for example, a $C_1$-$C_6$alkyl (or $C_{1-6}$alkyl) group contains from 1 to 6 carbon atoms.

Hydrocarbon refers to any substituent comprised of hydrogen and carbon as the only elemental constituents. Unless otherwise specified, hydrocarbyl groups may be optionally substituted. An unsubstituted hydrocarbon may be referred to, e.g., as a "pure hydrocarbon". The term hydrocarbon includes alkyl, cycloalkyl, polycycloalkyl, alkenyl, alkynyl, aryl and combinations thereof. Examples include phenyl, naphthyl, benzyl, phenethyl, cyclohexylmethyl, camphoryl and naphthylethyl. In some embodiments, hydrocarbon groups are aliphatic. In some embodiments, hydrocarbon groups are aromatic. In some embodiments, a hydrocarbon group may have from 1 to 50 carbon atoms therein (i.e., 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 carbon atoms).

Unless otherwise specified, an "alkyl" group is intended to include linear, branched, or cyclic hydrocarbon structures and combinations thereof. A combination would be, for example, cyclopropylmethyl. Lower alkyl refers to alkyl groups of from 1 to 6 carbon atoms. Examples of lower alkyl groups include methyl, ethyl, propyl, isopropyl, butyl, s- and t-butyl and the like. In some embodiments, alkyl groups are those of $C_{20}$ or below (i.e., $C_{1-20}$ alkyl). Cycloalkyl is a subset of alkyl and includes cyclic hydrocarbon groups of from 3 to 8 carbon atoms. Examples of cycloalkyl groups include c-propyl, c-butyl, c-pentyl, norbornyl and the like. Unless otherwise specified, an alkyl group may be substituted or unsubstituted.

An "alkenyl" group refers to an unsaturated hydrocarbon group containing at least one carbon-carbon double bond, including straight-chain, branched-chain, and cyclic groups. In some embodiments, an alkenyl group has 1 to 12 carbons (i.e., 1, 2, 3, 4, 5, 6, 7, 8, 9, 10, 11, or 12 carbons). Lower alkenyl designates an alkenyl group of from 1 to 7 carbons (i.e., 1, 2, 3, 4, 5, 6, or 7 carbons). Unless otherwise specified, an alkenyl group may be substituted or unsubstituted.

An "alkynyl" group refers to an unsaturated hydrocarbon group containing at least one carbon-carbon triple bond, including straight-chain, branched chain, and cyclic groups. Preferably, the alkynyl group has 1 to 12 carbons. The alkynyl group may be substituted or unsubstituted.

Aryl and heteroaryl (or aromatic and heteroaromatic moieties, respectively), mean (i) a phenyl group (or benzene) or a monocyclic 5- or 6-membered heteroaromatic ring containing 1-4 heteroatoms selected from oxygen (O), nitrogen (N), phosphorus (P), or sulfur (S); (ii) a bicyclic 9- or 10-membered aromatic or heteroaromatic ring system containing 0-4 heteroatoms selected from O, N, P, or S; or (iii) a tricyclic 13- or 14-membered aromatic or heteroaromatic ring system containing 0-5 heteroatoms selected from O, N, P, or S. The aromatic 6- to 14-membered carbocyclic rings include, e.g., benzene, naphthalene, indane, tetralin, and fluorene and the 5- to 10-membered aromatic heterocyclic rings include, e.g., imidazole, pyridine, indole, thiophene, benzopyranone, thiazole, furan, benzimidazole, quinoline, isoquinoline, quinoxaline, pyrimidine, pyrazine, tetrazole and pyrazole. As used herein aryl and heteroaryl refer to residues in which one or more rings are aromatic, but not all need be.

In a first aspect, the invention provides an amphiphilic copolymeer comprising repeat units of formulas:

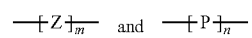

wherein

Z is a zwitterionic structural unit comprising at least one pendant heteroaromatic moiety, wherein the heteroaromatic moiety comprises a positively charged quaternary nitrogen atom, and wherein at least one negatively charged functional moiety is linked to the heteroaromatic moiety directly or through a linker, wherein the linker, where present, is an optionally substituted alkylene linker;

P is a structural unit comprising a hydrophobic moiety, said hydrophobic moiety being a linear, branched, or cyclic fluorine-substituted $C_1$-$C_{20}$ alkyl moiety;

m is an integer that is ≥1; and n is an integer that is ≥1.

While

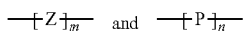

are referred to herein as repeat units, it will be readily appreciated by persons having ordinary skill in the art that if m or n, respectively, is 1, then such particular unit in the polymer is a single unit that does not repeat.

The repeat unit

may be referred to herein as the repeat unit $[Z]_m$, and the repeat unit

may be referred to herein as the repeat unit $[P]_n$.

Z is a zwitterionic structural unit comprising at least one pendant heteroaromatic moiety that comprises a positively charged quaternary nitrogen atom (e.g., a pyridine, imidazole, etc.). At least one negatively charged functional moiety is linked to the heteroaromatic moiety directly or through a linker, namely, an optionally substituted alkylene linker. In some embodiments, the linker is non-substituted. In other embodiments, the linker is substituted. For example, in some embodiments, the linker is substituted with alkyl or halogen ("halo").

The at least one negatively charged functional moiety that is linked to the heteroaromatic moiety (e.g., comprising a pyridine or other nitrogen-containing heteroaryl ring, etc.) may be any art-accepted moiety that provides a negative charge. In some embodiments, the at least one negatively charged functional moiety comprises a carboxylate anion, a sulfonate anion, a phosphonate anion, or an oxygen (for example, in some embodiments where the oxygen is attached directly to a nitrogen atom of a heteroaryl ring e.g., a pyridine ring—it may be attached directly to the nitrogen of ring). In particular embodiments, the at least one negatively charged functional moiety is a structural unit from 1,3-propane sultone (PS). In some embodiments, the at least one negatively charged functional moiety is —$(CH_2)_3SO_3$.

P is a structural unit comprising a hydrophobic moiety, said hydrophobic moiety being a linear, branched, or cyclic fluorine-substituted $C_1$-$C_{20}$ alkyl moiety (having 1, 2, 3, 4, 5, 6, 7, 8, 9, 10, 11, 12, 13, 14, 15, 16, 17, 18, 19, or 20 carbon atoms, or any range or subrange therein).

In some embodiments, the hydrophobic moiety is or comprises a perfluoroalkyl substances (wherein each carbon atom in the chain is fully saturated with fluorine, i.e., carbon-fluorine bonds only), or a polyfluoroalkyl substances (wherein one or more carbon atoms in the chain also contains a carbon-hydrogen bonds). In some embodiments, the hydrophobic moiety is or comprises, e.g, a pentafluorophenyl (meth)acrylate.

In particular embodiments, the hydrophobic moiety is of the formula —$C_rF_s$, wherein r is less than or equal to 20 (i.e., 1, 2, 3, 4, 5, 6, 7, 8, 9, 10, 11, 12, 13, 14, 15, 16, 17, 18, 19, or 20), and s is less than or equal to 41 (i.e., 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, or 41). In some embodiments, r is less than or equal to 10 (i.e., 1, 2, 3, 4, 5, 6, 7, 8, 9, or 10), and s is less than or equal to 21 (i.e., 1, 2, 3, 4, 5, 6, 7, 8, 9, 10, 11, 12, 13, 14, 15, 16, 17, 18, 19, 20, or 21). For example, a linear fully fluorinated C10 hydrophobic moiety would have the formula —$(CF_2)_9CF_3$, wherein r would be 10 and s would be 21 As will be readily apparent to a person having ordinary skill in the art, where any carbon atom of the hydrophobic moiety is not fully fluorinated, such carbon would have one or more hydrogen atoms attached thereto.

"m" and "n" designate the number of repeating units of $[Z]_m$ and $[P]_n$, respectively.

In some embodiments, m and n are integers independently selected from 0 to 10,000 (e.g., 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, 249, 250, 251, 252, 253, 254, 255, 256, 257, 258, 259, 260, 261, 262, 263, 264, 265, 266, 267, 268, 269, 270, 271, 272, 273, 274, 275, 276, 277, 278, 279, 280, 281, 282, 283, 284, 285, 286, 287, 288, 289, 290, 291, 292, 293, 294, 295, 296, 297, 298, 299, 300, 301, 302, 303, 304, 305, 306, 307, 308, 309, 310, 311, 312, 313, 314, 315, 316, 317, 318, 319, 320, 321, 322, 323, 324, 325, 326, 327, 328, 329, 330, 331, 332, 333, 334, 335, 336, 337, 338, 339, 340, 341, 342, 343, 344, 345, 346, 347, 348, 349, 350, 351, 352, 353, 354, 355, 356, 357, 358, 359, 360, 361, 362, 363, 364, 365, 366, 367, 368, 369, 370, 371, 372, 373, 374, 375, 376, 377, 378, 379, 380, 381, 382, 383, 384, 385, 386, 387, 388, 389, 390, 391, 392, 393, 394, 395, 396, 397, 398, 399, 400, 401, 402, 403, 404, 405, 406, 407, 408, 409, 410, 411, 412, 413, 414, 415, 416, 417, 418, 419, 420, 421, 422, 423, 424, 425, 426, 427, 428, 429, 430, 431, 432, 433, 434, 435, 436, 437, 438, 439, 440, 441, 442, 443, 444, 445, 446, 447, 448, 449, 450, 451, 452, 453, 454, 455, 456, 457, 458, 459, 460, 461, 462, 463, 464, 465, 466, 467, 468, 469, 470, 471, 472, 473, 474, 475, 476, 477, 478, 479, 480, 481, 482, 483, 484, 485, 486, 487, 488, 489, 490, 491, 492, 493, 494, 495, 496, 497, 498, 499, 500, 600, 700, 800, 900, 1000, 1100, 1200, 1300, 1400, 1500, 1600, 1700, 1800, 1900, 2000, 2100, 2200, 2300, 2400, 2500, 2600, 2700, 2800, 2900, 3000, 3100, 3200, 3300, 3400, 3500, 3600, 3700, 3800, 3900, 4000, 4100, 4200, 4300, 4400, 4500, 4600, 4700, 4800, 4900, 5000, 5100, 5200, 5300, 5400, 5500, 5600, 5700, 5800, 5900, 6000, 6100, 6200, 6300, 6400, 6500, 6600, 6700, 6800, 6900, 7000, 7100, 7200, 7300, 7400, 7500, 7600, 7700, 7800, 7900, 8000, 8100, 8200, 8300, 8400, 8500, 8600, 8700, 8800, 8900, 9000, 9100, 9200, 9300, 9400, 9500, 9600, 9700, 9800, 9900, or 10000), including any and all ranges and subranges therein.

In some embodiments, the inventive copolymer comprises the structural unit:

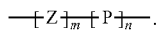

In some embodiments of the inventive copolymer, the repeat unit

is a repeat unit of formula

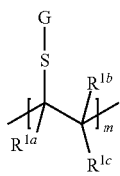

wherein:
S is a heteroaromatic ring having a positively charged quaternary nitrogen atom (e.g., a pyridine ring, etc.);
G is a moiety comprising the at least one negatively charged functional moiety that is linked to the heteroaromatic ring; and
$R^{1a}$, $R^{1b}$, and $R^{1c}$ are each individually selected from hydrogen, alkyl, phenyl, halo, hydroxyl, amino, nitro, and cyano.

In some embodiments, $R^{1a}$, $R^{1b}$, and $R^{1c}$ are each independently selected from hydrogen and alkyl.

In some embodiments, $R^{1a}$, $R^{1b}$, and $R^{1c}$ are each hydrogen.

In some embodiment of the inventive copolymer, the repeat unit

is a repeat unit of formula

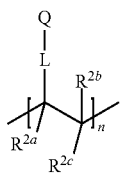

wherein
Q is the hydrophobic moiety;
L is not present or is a linking moiety; and
$R^{2a}$, $R^{2b}$, and $R^{2c}$ are each individually selected from hydrogen, alkyl, phenyl, halo, hydroxyl, amino, nitro, and cyano;

In some embodiments, $R^{2a}$, $R^{2b}$, and $R^{2c}$ are each independently selected from hydrogen and alkyl.

In some embodiments, $R^{2a}$, $R^{2b}$, and $R^{2c}$ are each hydrogen.

In some embodiments, L is a linker comprising a bond, alkylene, amide, ester, ether, or disulfide moiety, or any combination thereof.

In particular embodiments, L is a linker —C(=O)O-alkyl (wherein the alkyl chain attaches to Q).

In some embodiments, L is a linker —C(=O)O(CH$_2$)$_t$, wherein t is an integer from 0 to 5 (i.e., 1, 2, 3, 4, or 5).

In some embodiments, the inventive copolymer further comprises a repeat unit from a crosslinking moiety X. The crosslinking moiety can be any art-accepted moiety. For example, in some embodiments, the crosslinking moiety X is selected from a unit of polymerized monomer selected from arylene, alkylene, phenylene, 1,4-phenylene, divinylbenzene, ethylene glycol dimethacrylate, ethylene glycol diacrylate, vinyl methacrylate, allyl methacrylate, maleic anhydride, 1,3,5-trivinyltrimethylcyclotrisiloxane and glycidyl methacrylate, or any combination thereof.

In some embodiments, the inventive copolymer comprises a repeat unit from a crosslinking moiety X, the repeat unit having the formula:

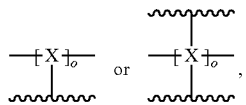

(which can be referred to both individually and collectively—i e., meaning one and/or the other structure—herein as a repeat unit $[X]_o$) wherein o is an integer selected from 0 to 10,000 (e.g., 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, 249, 250, 251, 252, 253, 254, 255, 256, 257, 258, 259, 260, 261, 262, 263, 264, 265, 266, 267, 268, 269, 270, 271, 272, 273, 274, 275, 276, 277, 278, 279, 280, 281, 282, 283, 284, 285, 286, 287, 288, 289, 290, 291, 292, 293, 294, 295, 296, 297, 298, 299, 300, 301, 302, 303, 304, 305, 306, 307, 308, 309, 310, 311, 312, 313, 314, 315, 316, 317, 318, 319, 320, 321, 322, 323, 324, 325, 326, 327, 328, 329, 330, 331, 332, 333, 334, 335, 336, 337, 338, 339, 340, 341, 342, 343, 344, 345, 346, 347, 348, 349, 350, 351, 352, 353, 354, 355, 356, 357, 358, 359, 360, 361, 362, 363, 364, 365, 366, 367, 368, 369, 370, 371, 372, 373, 374, 375, 376, 377, 378, 379, 380, 381, 382, 383, 384, 385, 386, 387, 388, 389, 390, 391, 392, 393, 394, 395, 396, 397, 398, 399, 400, 401, 402, 403, 404, 405, 406, 407, 408, 409, 410, 411, 412, 413, 414, 415, 416, 417, 418, 419, 420, 421, 422, 423, 424, 425, 426, 427, 428, 429, 430, 431, 432, 433, 434, 435, 436, 437, 438, 439, 440, 441, 442, 443, 444, 445, 446, 447, 448, 449, 450, 451, 452, 453, 454, 455, 456, 457, 458, 459, 460, 461, 462, 463, 464, 465, 466, 467, 468, 469, 470, 471, 472, 473, 474, 475, 476, 477, 478, 479, 480, 481, 482, 483, 484, 485, 486, 487, 488, 489, 490, 491, 492, 493, 494, 495, 496, 497, 498, 499, 500, 600, 700, 800, 900, 1000, 1100, 1200, 1300, 1400, 1500, 1600, 1700, 1800, 1900, 2000, 2100, 2200, 2300, 2400, 2500, 2600, 2700, 2800, 2900, 3000, 3100, 3200, 3300, 3400, 3500, 3600, 3700, 3800, 3900, 4000, 4100, 4200, 4300, 4400, 4500, 4600, 4700, 4800, 4900, 5000, 5100, 5200, 5300, 5400, 5500, 5600, 5700, 5800, 5900, 6000, 6100, 6200, 6300, 6400, 6500, 6600, 6700, 6800, 6900, 7000, 7100, 7200, 7300, 7400, 7500, 7600, 7700, 7800, 7900, 8000, 8100, 8200, 8300, 8400, 8500, 8600, 8700, 8800, 8900, 9000, 9100, 9200, 9300, 9400, 9500, 9600, 9700, 9800, 9900, or 10000), including any and all ranges and subranges therein.

In some embodiments, the inventive copolymer comprises one or more structures of formula (i)-(vi):

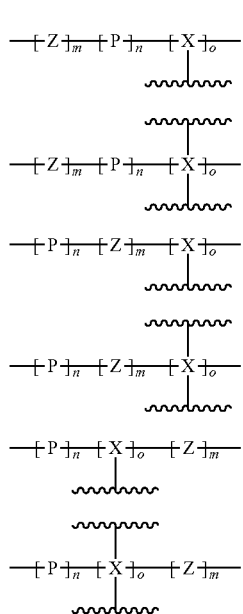

In some embodiments, the inventive copolymer comprises a first repeat unit of formula (I) and a second repeat unit of formula (II):

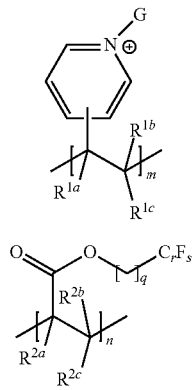

wherein:
G is a moiety as hereinbefore described comprising the at least one negatively charged functional moiety that is linked to the pyridine ring;
$R^{1a}$, $R^{1b}$, and $R^{1c}$ are each individually selected from hydrogen, alkyl, phenyl, halo, hydroxyl, amino, nitro, and cyano;

$R^{2a}$, $R^{2b}$, and $R^{2c}$ are each individually selected from hydrogen, alkyl, phenyl, halo, hydroxyl, amino, nitro, and cyano;
q is 0-4;
r≤10; and
s≤21.

In some embodiments of the inventive copolymer, the first repeat unit of formula (I) is of formula (IA):

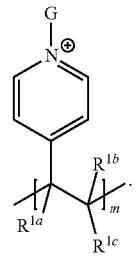

In some embodiments, G is $-(CH_2)_{1-6}SO_3^-$ (e.g., $-(CH_2)SO_3^-$, $-(CH_2)_2SO_3^-$, $-(CH_2)_3SO_3^-$, $-(CH_2)_4SO_3^-$, $-(CH_2)_5SO_3^-$, or $-(CH_2)_6SO_3^-$).

In some embodiments, $R^{1a}$, $R^{1b}$, and $R^{1c}$ are each individually selected from hydrogen and methyl.

In some embodiments, the pyridine in formula (I) or formula (IA) is not pyridine, but is any other nitrogen-containing heteroaryl ring.

In some embodiments, the inventive copolymer comprising a first repeat unit of formula (I) and a second repeat unit of formula (II) additionally comprises a repeat unit from a crosslinking moiety X. For example, the copolymer can comprise a repeat unit selected from:

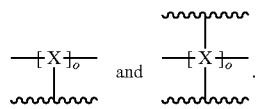

In some embodiments, the copolymer includes one or more structural unit(s) from one or more additional monomer(s).

In some embodiments, the sum of Z, P, and X (where present) repeat units in the inventive copolymer makes up 20 to 100 mol % (e.g., 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 99.5, or 100 mol %) of all units present in the copolymer. As will be apparent, where Z, P, and X (where present) make up 100 mol % of the copolymer, no other structural units from other monomers will be present.

In some embodiments, the $[Z]_m$ repeat unit makes up 5 to 95 molar % (mol %) (e.g., 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95 mol %), including any and all ranges and subranges therein, of units in the copolymer.

In some embodiments, the $[P]_n$ repeat unit in the copolymer makes up 5 to 95 mol % (e.g., 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, or 95 mol %), including any and all ranges and subranges therein, of units in the copolymer.

In some embodiments, the $[X]_o$ repeat unit in the copolymer makes up 0 to 90 mol % (e.g., 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 mol %), including any and all ranges and subranges therein.

In some embodiments of the inventive copolymer Z, P, and X are selected from the structural units shown in the following embodiments, and/or the copolymer comprises one of the following structural units. Embodiments of the inventive copolymer include not only the following configurations, but also any combination of the depicted units from multiple embodiments as shown below and as described herein:

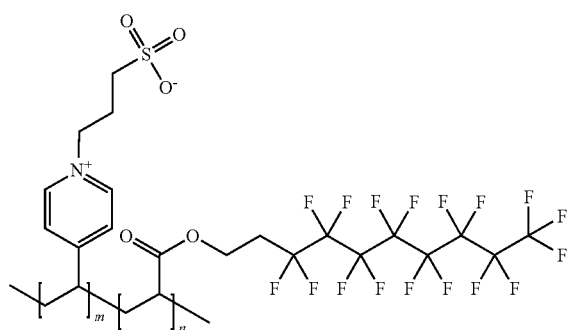

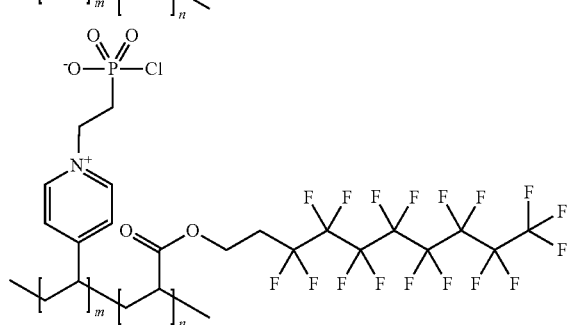

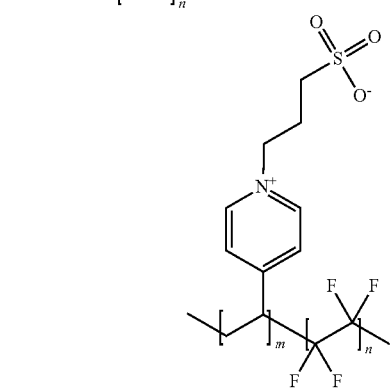

-continued

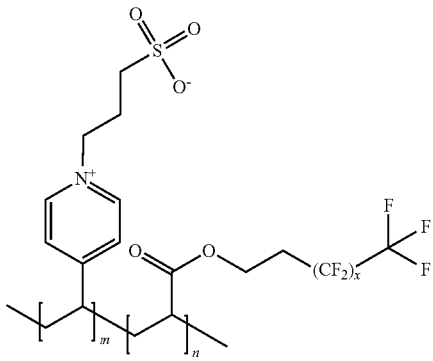

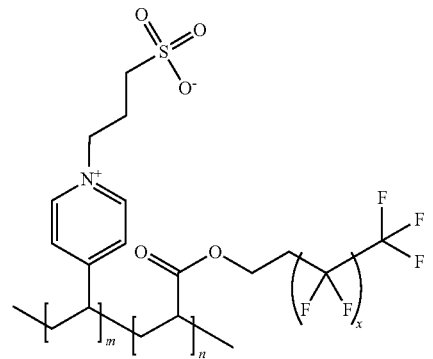

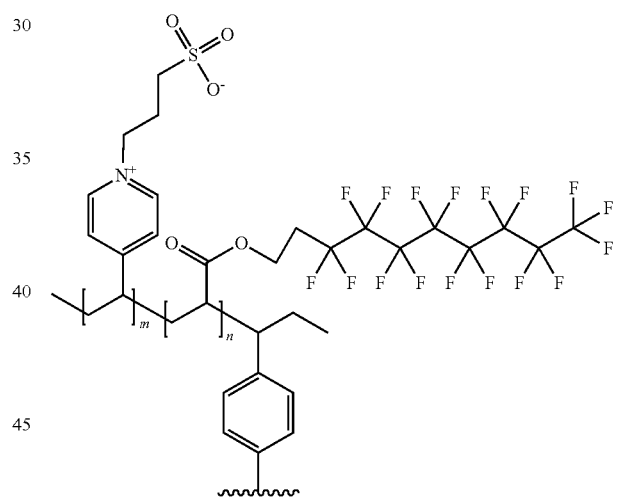

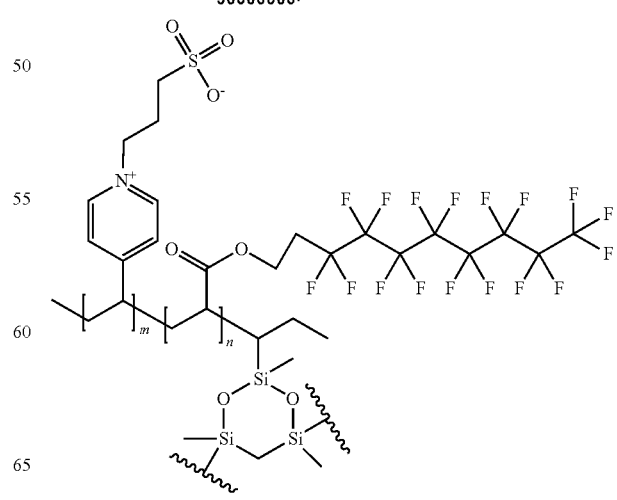
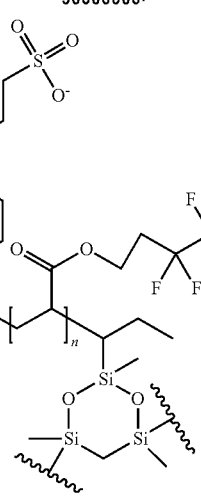

-continued

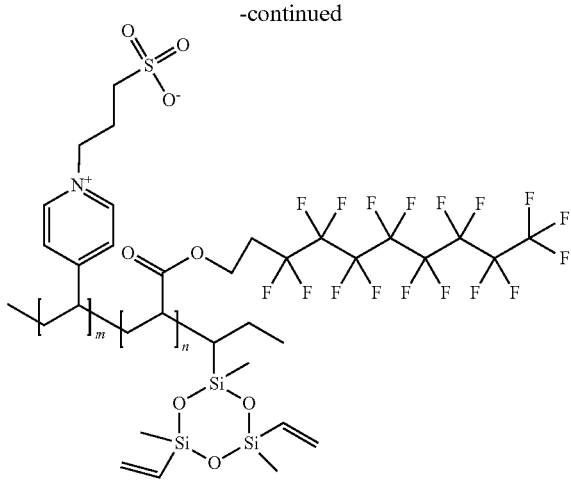

wherein x is an integer from 0 to 9 (i.e., 0, 1, 2, 3, 4, 5, 6, 7, 8, or 9).

In some embodiments, the inventive copolymer has a contrast in comonomer surface energies of at least 48 mN m$^{-1}$ (e.g., at least 48, 49, 50, 51, 52, 53, 54, 55, 56, 57, or 58 mN m$^{-1}$).

In a second aspect, the invention provides a composition comprising the copolymer according to the first aspect of the invention, including any embodiment or combination of embodiments thereof.

In some embodiments, the composition is a film.

In some embodiments, the composition is a film comprising a layer of the copolymer according to the first aspect of the invention.

In some embodiments, the layer of the copolymer has a thickness of 5 nm to 100 microns (e.g., 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, 249, 250, 251, 252, 253, 254, 255, 256, 257, 258, 259, 260, 261, 262, 263, 264, 265, 266, 267, 268, 269, 270, 271, 272, 273, 274, 275, 276, 277, 278, 279, 280, 281, 282, 283, 284, 285, 286, 287, 288, 289, 290, 291, 292, 293, 294, 295, 296, 297, 298, 299, 300, 301, 302, 303, 304, 305, 306, 307, 308, 309, 310, 311, 312, 313, 314, 315, 316, 317, 318, 319, 320, 321, 322, 323, 324, 325, 326, 327, 328, 329, 330, 331, 332, 333, 334, 335, 336, 337, 338, 339, 340, 341, 342, 343, 344, 345, 346, 347, 348, 349, 350, 351, 352, 353, 354, 355, 356, 357, 358, 359, 360, 361, 362, 363, 364, 365, 366, 367, 368, 369, 370, 371, 372, 373, 374, 375, 376, 377, 378, 379, 380, 381, 382, 383, 384, 385, 386, 387, 388, 389, 390, 391, 392, 393, 394, 395, 396, 397, 398, 399, 400, 401, 402, 403, 404, 405, 406, 407, 408, 409, 410, 411, 412, 413, 414, 415, 416, 417, 418, 419, 420, 421, 422, 423, 424, 425, 426, 427, 428, 429, 430, 431, 432, 433, 434, 435, 436, 437, 438, 439, 440, 441, 442, 443, 444, 445, 446, 447, 448, 449, 450, 451, 452, 453, 454, 455, 456, 457, 458, 459, 460, 461, 462, 463, 464, 465, 466, 467, 468, 469, 470, 471, 472, 473, 474, 475, 476, 477, 478, 479, 480, 481, 482, 483, 484, 485, 486, 487, 488, 489, 490, 491, 492, 493, 494, 495, 496, 497, 498, 499, 500, 1000, 2000, 3000, 4000, 5000, 6000, 7000, 8000, 9000, 10000, 11000, 12000, 13000, 14000, 15000, 16000, 17000, 18000, 19000, 20000, 21000, 22000, 23000, 24000, 25000, 26000, 27000, 28000, 29000, 30000, 31000, 32000, 33000, 34000, 35000, 36000, 37000, 38000, 39000, 40000, 41000, 42000, 43000, 44000, 45000, 46000, 47000, 48000, 49000, 50000, 51000, 52000, 53000, 54000, 55000, 56000, 57000, 58000, 59000, 60000, 61000, 62000, 63000, 64000, 65000, 66000, 67000, 68000, 69000, 70000, 71000, 72000, 73000, 74000, 75000, 76000, 77000, 78000, 79000, 80000, 81000, 82000, 83000, 84000, 85000, 86000, 87000, 88000, 89000, 90000, 91000, 92000, 93000, 94000, 95000, 96000, 97000, 98000, 99000, or 100000 nm), including any and al ranges and subranges therein.

In some embodiments, the film has an average root mean square (RMS) roughness of 0.1 nm to 500 micron (e.g., 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, 249, 250, 251, 252, 253, 254, 255, 256, 257, 258, 259, 260, 261, 262, 263, 264, 265, 266, 267, 268, 269, 270, 271, 272, 273, 274, 275, 276, 277, 278, 279, 280, 281, 282, 283, 284, 285, 286, 287, 288, 289, 290, 291, 292, 293, 294, 295, 296, 297, 298, 299, 300, 301, 302, 303, 304, 305, 306, 307, 308, 309, 310, 311, 312, 313, 314, 315, 316, 317, 318, 319, 320, 321, 322, 323, 324, 325, 326, 327, 328, 329, 330, 331, 332, 333, 334, 335, 336, 337, 338, 339, 340, 341, 342, 343, 344, 345, 346, 347, 348, 349, 350, 351, 352, 353, 354, 355, 356, 357, 358, 359, 360, 361, 362, 363, 364, 365, 366, 367, 368, 369, 370, 371, 372, 373, 374, 375, 376, 377, 378, 379, 380, 381, 382, 383, 384, 385, 386, 387, 388, 389, 390, 391, 392, 393, 394, 395, 396, 397, 398, 399, 400, 401, 402, 403, 404, 405, 406, 407, 408, 409, 410, 411, 412, 413, 414, 415, 416, 417, 418, 419, 420, 421, 422, 423, 424, 425, 426, 427, 428, 429, 430, 431, 432, 433, 434, 435, 436, 437, 438, 439, 440, 441, 442, 443, 444, 445, 446, 447, 448, 449, 450, 451, 452, 453, 454, 455, 456, 457, 458, 459, 460, 461, 462, 463, 464, 465, 466, 467, 468, 469, 470, 471, 472, 473, 474, 475, 476, 477, 478, 479, 480, 481, 482, 483, 484, 485, 486, 487, 488, 489, 490, 491, 492, 493, 494, 495, 496, 497, 498, 499, 500, 1000, 2000, 3000, 4000, 5000, 6000, 7000, 8000, 9000, 10000, 11000, 12000, 13000, 14000, 15000, 16000, 17000, 18000, 19000, 20000, 21000, 22000, 23000, 24000, 25000, 26000, 27000, 28000, 29000, 30000, 31000, 32000, 33000, 34000, 35000, 36000, 37000, 38000, 39000, 40000, 41000, 42000, 43000, 44000, 45000, 46000, 47000, 48000, 49000, 50000, 51000, 52000, 53000, 54000, 55000, 56000, 57000, 58000, 59000, 60000, 61000, 62000, 63000, 64000, 65000, 66000, 67000, 68000, 69000, 70000, 71000, 72000, 73000, 74000, 75000, 76000, 77000, 78000, 79000, 80000, 81000, 82000, 83000, 84000, 85000, 86000, 87000, 88000, 89000, 90000, 91000, 92000, 93000, 94000, 95000, 96000, 97000, 98000, 99000, 100000, 200000, 300000, 400000, or 500000 nm), including any and all ranges and subranges therein.

In some embodiments, the invention provides a composition comprising:
a coating material comprising a copolymer according to the first aspect of the invention; and
a substrate;
wherein the substrate is coated with a layer of the coating material (e.g., the 5 nm to 100 μm layer discussed above) on at least one side.

The substrate may be any desirable art-accepted substrate. In some embodiments, the substrate is selected from porous material, non-porous material, organic material (e.g. plastic, fabric, paper products, wood), and inorganic material (e.g. metal, glass, ceramics, or porcelain).

In some embodiments, the substrate is selected from a separation membrane, artificial organ, artificial implant, bone, rock, soil, capillary tubes, medical/hospital surface, pipes that convey liquid, food processing device, catalyst, convex or concave geometries, ship hulls, undersea apparatuses, breathing apparatus, or bacteria or tissue culture materials (e.g., microtiter/well plates).

In a third aspect, the invention provides an article comprising the copolymer according to the first aspect of the invention or the composition according to the second aspect of the invention.

The article may be any art-acceptable article.

In particular embodiments, the article is one for which there is a desire to prevent or reduce biofouling.

In some embodiments, the article is a paper product, a filter, a membrane, an implant device, a medical or chemical diagnosis device, a sensor, a signal-detection device, a breathing device, a dialysis device, an extracorporeal membrane oxygenation device, a drug delivery device, a transportation vehicle, sieve, syringe, plastic tubing, or storage tank.

In a fourth aspect, the invention provides a method of.
decreasing, reducing, or inhibiting microorganism growth, or killing or denaturing a microorganism, or inhibiting biofilm formation; or
controlling bacteria growth on a substrate;
said method comprising applying a layer of the copolymer according to the first aspect of the invention on a substrate.

In some embodiments, the inventive method is for decreasing, reducing, or inhibiting microorganism growth, or killing or denaturing a microorganism, or inhibiting biofilm formation.

In some embodiments, the inventive method is for controlling bacteria growth on a substrate.

In some embodiments of the inventive method, applying the layer of the copolymer on the substrate comprises:

placing the substrate in an iCVD reactor under vacuum condition;
flowing into the reactor in parallel or in sequence a plurality of materials comprising:
an inert carrier gas;
an initiator;
a first monomer that is the source of the at least one pendant heteroaromatic moiety in the

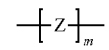

repeat unit;
a second monomer that is the source of the

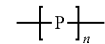

repeat unit; and optionally a crosslinker,
thereby forming a polymeric layer on at least one side of the substrate via iCVD; and exposing the polymeric layer to a negatively charged functional moiety, thereby forming the layer of the copolymer according to claim 1 on the substrate.

In some embodiments of the inventive method, said exposing the polymeric layer to a negatively charged functional moiety results in functionalizing the pendant heteroaromatic moiety in the

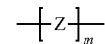

repeat unit with the at least one negatively charged functional moiety.

In some embodiments, said exposing the polymeric layer to a negatively charged functional moiety comprises exposing the polymeric layer to a compound capable of functionalizing the pendant heteroaromatic moiety in the

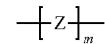

repeat unit with a moiety comprising a carboxylate anion, a sulfonate anion, phosphonate anion, or an oxygen atom.

In some embodiments, said exposing the polymeric layer to a negatively charged functional moiety comprises exposing the polymeric layer to 1,3-propane sultone (PS).

In some embodiments, said exposing the polymeric layer to a negatively charged functional moiety comprises exposing the polymeric layer to 1,3-propane sultone (PS), thereby forming a pyridine-based (or other nitrogen-comprising heteroaryl ring-based) sulfobetaine zwitterionic functional group that is comprised within the

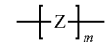

repeat unit.

Examples

The invention will now be illustrated, but not limited, by reference to the specific embodiments described in the following examples.

To date, antifouling polymer chemistries aimed at the solid-liquid interface have relied predominantly on strong surface hydration, creating a large enthalpic penalty for microbes to replace tightly bound water molecules. The most prevalent antifouling polymer continues to be poly (ethylene glycol) (PEG) and its derivatives, which feature a large fraction of hydrophilic ether bonds along the polymer backbone. In the past decade, zwitterionic polymers have emerged as a promising alternative because of the strong electrostatic hydration resulting from zwitterionic moieties such as phosphorylcholine, carboxybetaine, or sulfobetaine. Impressively, over 92% reduction in adhesion of *Escherichia coli* and *Staphylococcus aureus* has been achieved over 3 hours using a zwitterionic 2-methacryloyloxyethyl phosphorylcholine coating; up to 99% reduction in adhesion of *E. coli* was observed after 2 hours on 2-methacryloyl phosphorylcholine gels. With near-zero water contact angles, zwitterionic polymers have pushed the performance of hydration-based antifouling materials close to the thermodynamic limit.

Amphiphilic polymers have become a major focus of antifouling materials research in recent years in an attempt to build upon the successes of zwitterionic polymers. The antifouling effect of amphiphilic polymers has been attributed to the unwelcoming landscape featuring domains of heterogeneous surface energy that minimize the adhesion of bacteria and/or their attachment appendages. By mixing hydrophilic and hydrophobic moieties on the molecular level, amphiphilic polymers are believed to repel a broader range of microbes than that of the homogeneously hydrophilic or hydrophobic surfaces. Nevertheless, existing amphiphilic polymers are more commonly used to resist algal marine foulants and have yet to outperform the current gold standard, zwitterionic chemistry.

Distinct from fully submerged surfaces, a three-phase interface presents new challenges to antifouling material design, due to the simultaneous need for hydrophilicity at the liquid-solid interface and hydrophobicity at the air-solid interface. Such a surface is particularly important because many bacteria species form biofilms preferentially at the solid-liquid-air interface causing severe fouling. For example, the in situ generation and management of oxygen from seawater for divers is rife with challenges that will require advances in current technology to overcome. Primary among those challenges is keeping wetted components (e.g. water purification membranes, gas separation membranes, piping, and storage devices) with an abundance of solid-liquid-air interfaces free from accumulation of infectious agents that could harm human users.

P4VPz-co-PFDA

Embodiments of the presently-disclosed copolymers have an amphiphilic surface, with heterogeneities in surface energy at the molecular level, which allows them to effectively resist fouling at the three-phase contact line by switching between high and low surface energy states in response to surface wetting. To overcome the limited disruption of biofilm formation by existing amphiphilic chemistries, copolymer embodiments have maximized contrast in surface energy between the hydrophilic and hydrophobic components. In general, that contrast in surface energies has been limited to <40 mN m$^{-1}$, as seen in examples that include copolymerizing 2-hydroxyethyl methacrylate (HEMA, with a surface energy of ~47 mN m$^{-1}$) with 1H,1H,2H,2H-perfluorodecyl acrylate (PFDA, with a surface energy of ~9 mN m$^{-1}$) or zwitterion (~70 mN m$^{-1}$ for a zwitterionic methacrylate) with polystyrene (~42 mN m$^{-1}$). Indeed, solution-based synthesis and application of amphiphilic copolymers become increasingly challenging with greater contrast in comonomer surface energies due to the lack of a common solvent for the disparate repeat units.

Nevertheless, the P4VPz-co-PFDA copolymer disclosed in this example is an amphiphilic copolymer with even greater contrast in comonomer surface energies (i.e. a contrast of ~60 mN m$^{-1}$) without causing microphase separation, leading to enhanced resistance to *P. aeruginosa* biofilm formation at the solid-liquid-air interface compared to that of the solely zwitterionic chemistry. That stark contrast was obtained by copolymerizing zwitterionic and fluorinated monomers using an all-dry synthesis technique, namely initiated Chemical Vapor Deposition (iCVD), thus circumventing the limitation imposed by solubility. The amphiphilic copolymer features molecular-level heterogeneities, distinct from most amphiphilic copolymers where microphase separation commonly occurs between the hydrophilic and hydrophobic domains. Microphase separation is undesirable for antifouling at the three-phase contact line because the locally minimized interfacial energy reduces the driving force for dynamic chain reorientation and thus chain mobility in response to surface wetting state. The amphiphilic copolymer outperformed zwitterionic polymers synthesized using iCVD in resisting biofilm formation at the triple interface, highlighting the effectiveness of our design principle. The all-dry synthesis approach is substrate-independent, promising broad application of the new antifouling chemistry in fields where solid-liquid-air interfaces are common, such as food processing, healthcare, and underwater performance.

The amphiphilic copolymer was created using the iCVD technique followed by vapor-based derivatization, iCVD was performed under vacuum where the substrate to be coated was maintained at near-ambient temperatures, ensuring the applicability of iCVD to substrates with limited thermal stability (such as membrane-, paper- or fabric-based devices). Growth of the polymer thin films was monitored in real time using an in situ interferometer system to enable control of coating thickness (200 nm in this case). During a deposition, monomer vapors of 4-vinylpyridine (4VP) and PFDA were metered into the vacuum chamber (kept at 0.4 Torr) at a ratio of approximately 4:1, which subsequently adsorbed to the substrates placed on a temperature-controlled stage (held at 35° C.). Polymerization of the surface-adsorbed monomers was initiated by tert-butoxide radicals, generated by the thermal decomposition of tert-butyl peroxide (TBPO) using a heated filament array (straddling over the temperature-controlled stage and held at 245° C.). The iCVD technique permits copolymerization of any monomer with appropriate volatility, free of the constraints on monomer solubility or the need for protection groups that are common for solution-based synthesis. Detailed deposition conditions are listed in Table 1:

TABLE 1

Reaction conditions for the iCVD synthesis of copolymers and homopolymers

| (a) | Flowrate (sccm) | | | | |
|---|---|---|---|---|---|
| Sample | 4VP | DVB | TBPO | Argon | %$_{DVB}$ |
| P4VP | 3.1 | 0.0 | 0.7 | 0.8 | 0.0 |
| P4VP-co-DVB | 4.0 | 0.3 | 0.6 | 0.8 | 10.9 |
| PDVB | 0.0 | 1.2 | 0.5 | 1.0 | 100.0 |

TABLE 1-continued

Reaction conditions for the iCVD synthesis
of copolymers and homopolymers (b)

| Sample | Flowrate (sccm) | | | | |
|---|---|---|---|---|---|
| | 4VP | PFDA | TBPO | Argon | %$_{PFDA}$ |
| P4VP | 3.1 | 0.0 | 0.7 | 0.8 | 0.0 |
| P4VP-co-PFDA | 2.9 | 0.1 | 0.6 | 2.1 | 45.3 |
| PPFDA | 0.0 | 0.1 | 0.6 | 2 | 100.0 |

Flow rates for of each vapor phase species are shown for depositions of homopolymers, PFDA-co-DVB (a), and P4VP-co-PFDA (b).

The amphiphilic copolymer was obtained by derivatizing the pyridine nitrogen in the poly(4VP-co-PFDA) (P4VP-co-PFDA) via exposure to vapors of 1,3-propanesultone (PS), creating zwitterionic sulfobetaine functional groups via a ring-opening reaction. No rinsing step was performed following the vapor-phase derivatization because unreacted PS molecules were readily outgassed from the film under vacuum. The absence of entrapped, unreacted PS molecules in the derivatized films was demonstrated using nuclear magnetic resonance (NMR) spectroscopy. Upon completion of derivatization, P4VPz films were soaked in deuterium oxide for 14 hours, and the deuterium oxide solution was shown to be free of P4VPz film components by $^1$H NMR. The PS-treated coating is denoted as P4VPz-co-PFDA.

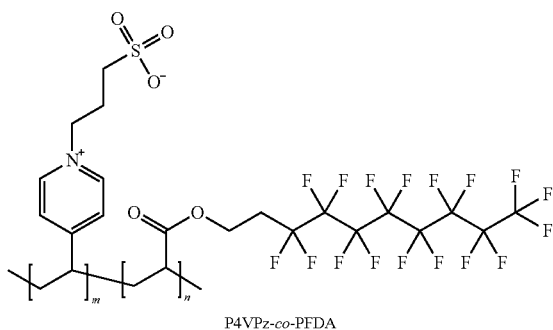

P4VPz-co-PFDA

To confirm the molecular structures of the iCVD polymers, the Fourier transform infrared (FTIR) spectrum of P4VP-co-PFDA was compared with those of the homopolymers: poly(PFDA) (PPFDA) and poly(4VP) (P4VP) (see FIG. 1). Presence of the expected functional groups in the P4VP and PPFDA homopolymers was confirmed. The carbonyl peak at 1738 cm$^{-1}$ (corresponding to the C=O stretching of PFDA) grows with the amount of PFDA repeat units in the polymers (inset of FIG. 1). P4VP-co-PFDA contains 45% PFDA repeat units, calculated using the ratio of fluorine atoms (in PFDA) to nitrogen atoms (in 4VP) obtained from XPS survey scans.

Figure 2:
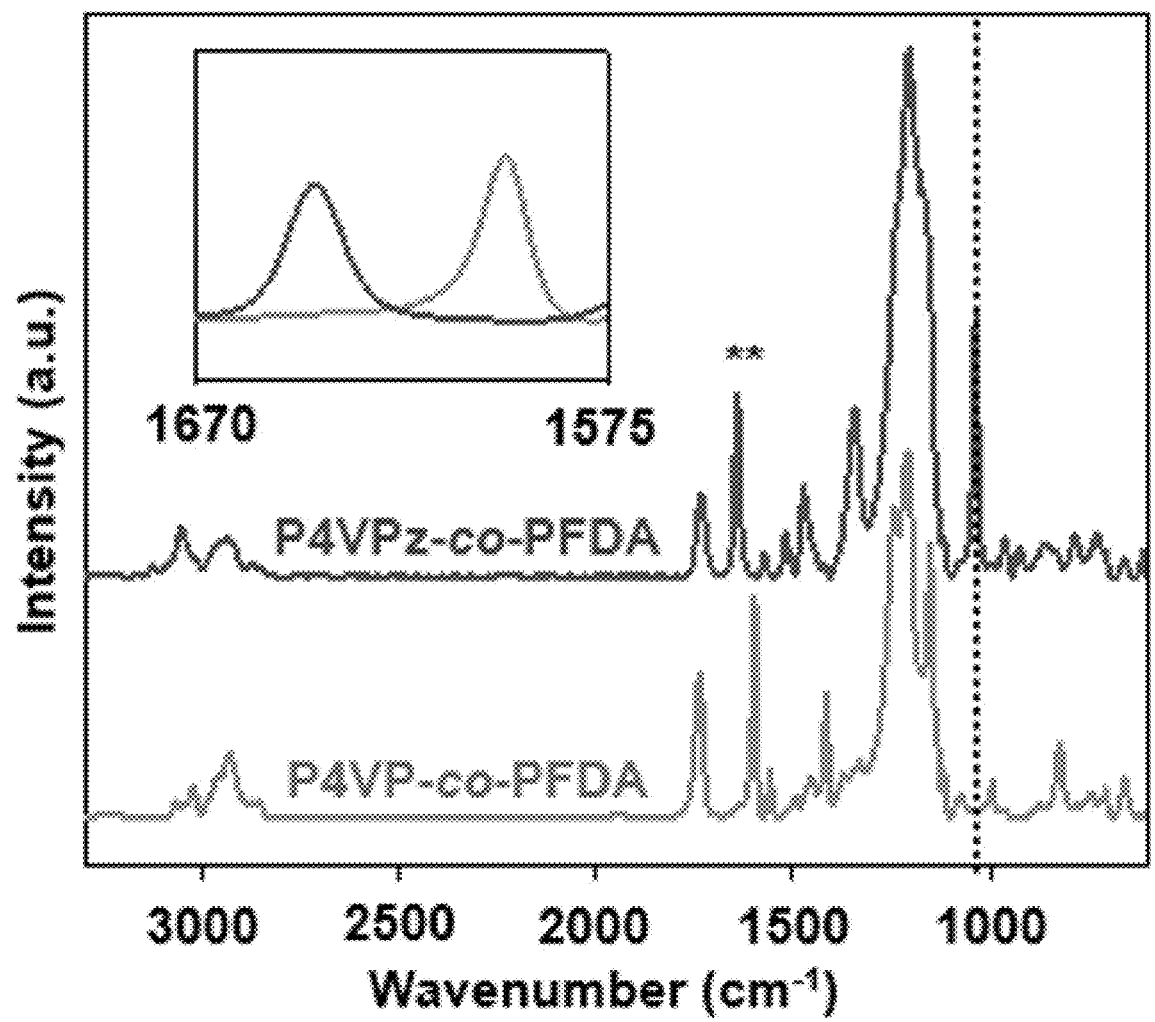
FIG. 2 shows FTIR spectra of copolymers before (bottom) and after (top) derivatization with PS. The peak at 1036 cm$^{-1}$ (dashed line) corresponds to the S—O stretching in sulfobetaine and indicates successful derivatization. The inset shows a shift of the pyridine peak at 1597 cm$^{-1}$ to quaternized pyridyl at 1641 cm$^{-1}$ upon derivatization with PS (**). The full blue-shift of the peak in the inset shows a complete conversion of 4VP to zwitterionic sulfobetaine.
Figure 3:
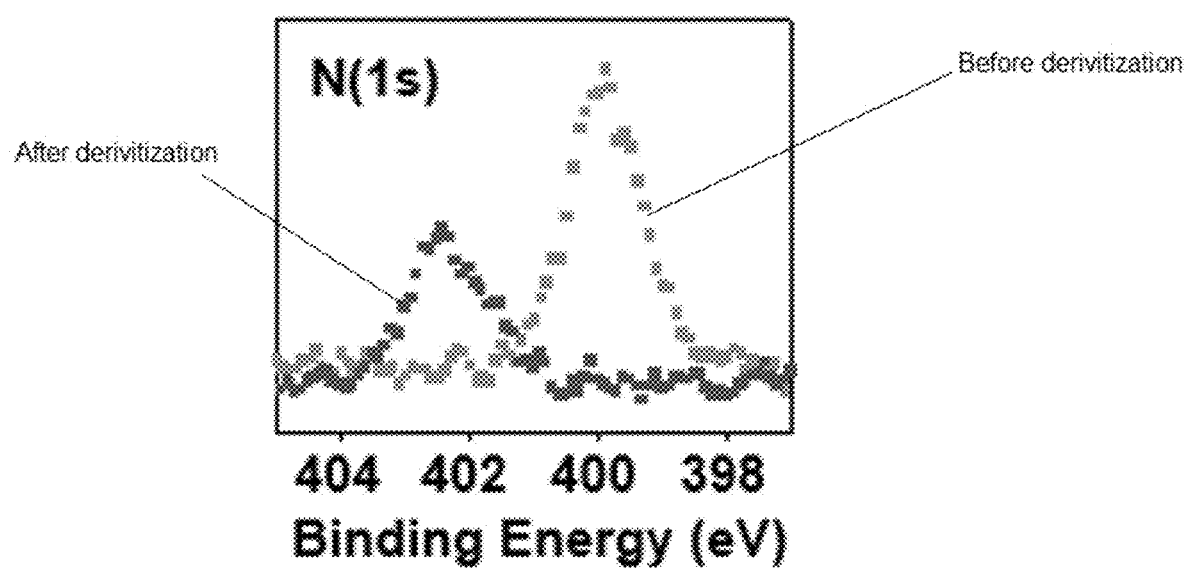
FIG. 3 shows a N(1s) high-resolution XPS spectrum of P4VP-co-PFDA (gold, before derivatization) and P4VPz-co-PFDA (green, after derivatization) shows the conversion of the pyridine nitrogen to a quaternary pyridyl cation.

The zwitterionic moieties in P4VPz-co-PFDA were confirmed by the peak at 1036 cm$^{-1}$ in the FTIR spectrum (FIG. 2, dotted line), corresponding to the S—O stretching in sulfobetaine, which emerged upon the vapor-phase derivatization. Furthermore, the peak at 1597 cm$^{-1}$ (FIG. 2 inset), corresponding to the C—C and C—N stretching of the pyridine ring, blue-shifts to 1641 cm$^{-1}$ (FIG. 2 inset, first peak), a wavenumber characteristic of quaternized pyridyl, indicating a complete reaction conversion upon derivatization. The complete conversion was further corroborated by the XPS high-resolution scan of N(1s) in P4VP-co-PFDA and P4VPz-co-PFDA (FIG. 3). N(1s) in P4VP-co-PFDA displays a binding energy of 399.5 eV, corresponding to the pyridine nitrogen, and a binding energy of 402.5 eV in P4VPz-co-PFDA, corresponding to quaternary ammonium nitrogen.

The combined FTIR and XPS analyses confirmed the successful synthesis of an amphiphilic copolymer composed of comonomers bearing hydrophilic sulfobetaine side chains and hydrophobic fluorinated side chains.

The zwitterionic coating, used here as a benchmark, was similarly synthesized by iCVD polymerization of 4VP and divinylbenzene (DVB) with a feed ratio of approximately 14:1 (i.e. without PFDA) followed by the treatment using PS vapor. DVB was incorporated at 12.9 mol % into the zwitterionic coating as a crosslinker to render the zwitterionic coating, P4VPz, insoluble in water. Thickness measurements of P4VPz films before and after soaking in water, as well as the NMR spectrum of deuterium oxide incubated on a P4VPz coated substrate, supported this lack of solubility (see Table 2).

TABLE 2

Thickness of zwitterion-containing
polymer films after water exposure

| | Thickness (nm) | |
|---|---|---|
| Sample | Before Soak | After Soak |
| P4VPz | 236.4 ± 0.07 | 221.1 ± 0.07 |
| P4VPz-co-PFDA | 334.5 ± 0.4 | 320.7 ± 0.5 |

Ellipsometry measurements of polymer film thickness before and after 8 hours of soaking in purified water. The minimal change in thickness was attributed to the rearrangement of the polymer coating upon equilibration during drying after the soak.

The amphiphilic copolymer is distinct from most existing amphiphilic materials because of its molecular-level heterogeneities, evidenced via atomic force microscopy (AFM) and X-ray diffraction (XRD).

Figure 4:
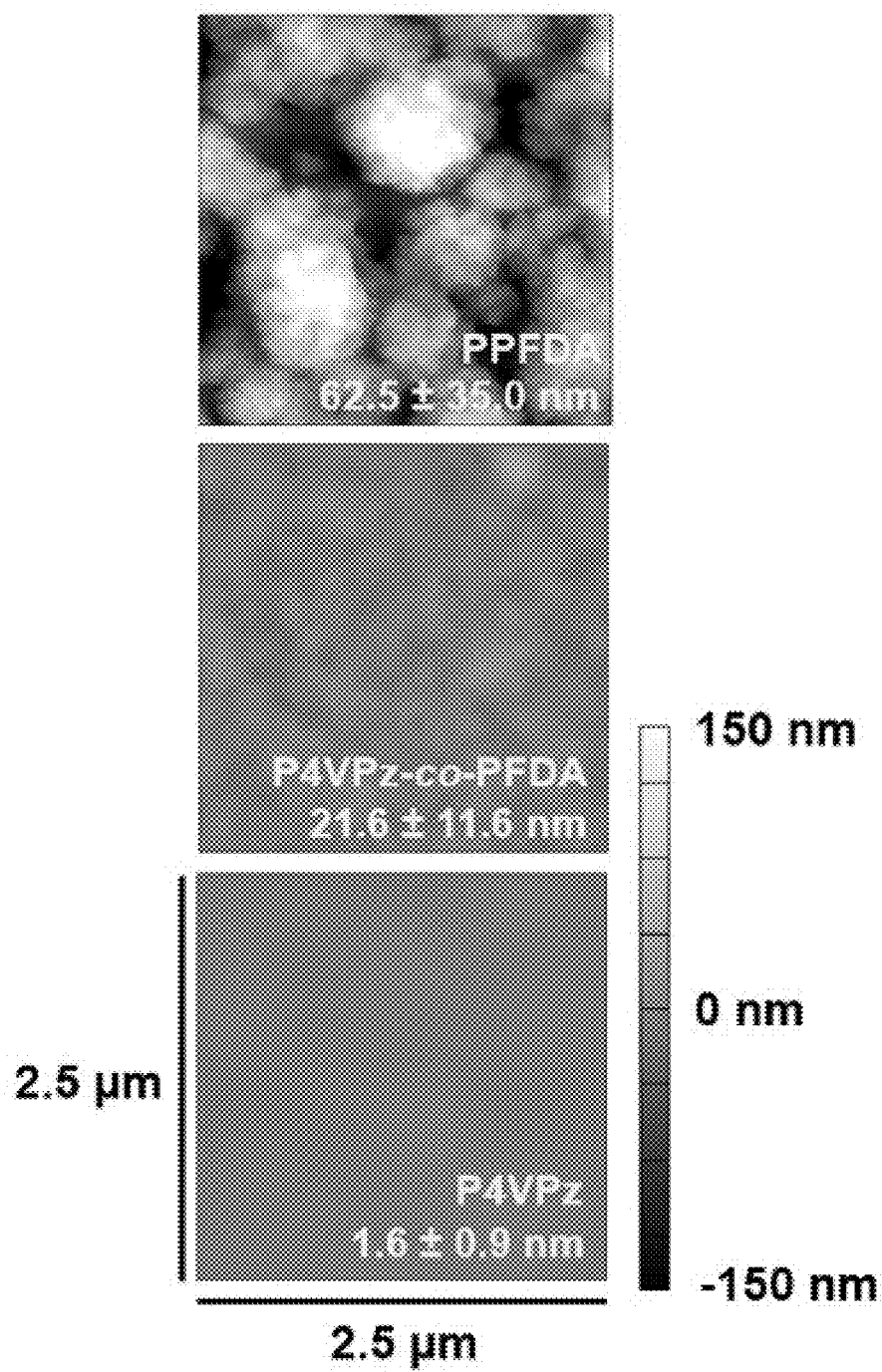
FIG. 4 shows atomic force microscopy height scans of iCVD polymer coatings of P4VPz (bottom), P4VPz-co-PFDA (center), and PPFDA (top) with RMS roughness values overlaid. Data are mean±SD; n=5.

AFM captures the surface roughness and topography of P4VPz, P4VPz-co-PFDA, and PPFDA (FIG. 4). P4VPz deposited on silicon wafers presents a relatively flat surface with root mean square (RMS) roughness (in height) of 1.6±0.9 nm, calculated across a scanning field of 2.5 µm×2.5 µm. The smoothness reflects the topography of the underlying substrate (i.e. polished silicon wafer), highlighting the conformal nature of the iCVD technique. The PPFDA samples stand in stark contrast with a high surface roughness and calculated RMS value of 62.5±35.0 nm. Such roughness is a result of the randomly oriented crystalline segments in PPFDA formed by packing of adjacent fluorinated side chains. The single lamella crystal phase with the characteristic periodicity of ~15.5 Å (corresponding to the length of the fluorinated side chain in PFDA) was confirmed using X-ray diffraction (XRD).

The amphiphilic copolymer, P4VPz-co-PFDA exhibits a moderate RMS roughness of 21.6±11.6 nm. Roughness of the amphiphilic copolymer is likely a result of surface instability caused by the molecular-level mixing of the hydrophilic and hydrophobic moieties, instead of crystallinity like the case for PPFDA. Indeed, XRD of P4VPz-co-PFDA shows no signs of crystallinity, substantiating the molecular-level heterogeneities of P4VPz-co-PFDA, where packing of the PFDA side chains is disrupted by adjacent zwitterionic units.

Figure 5:
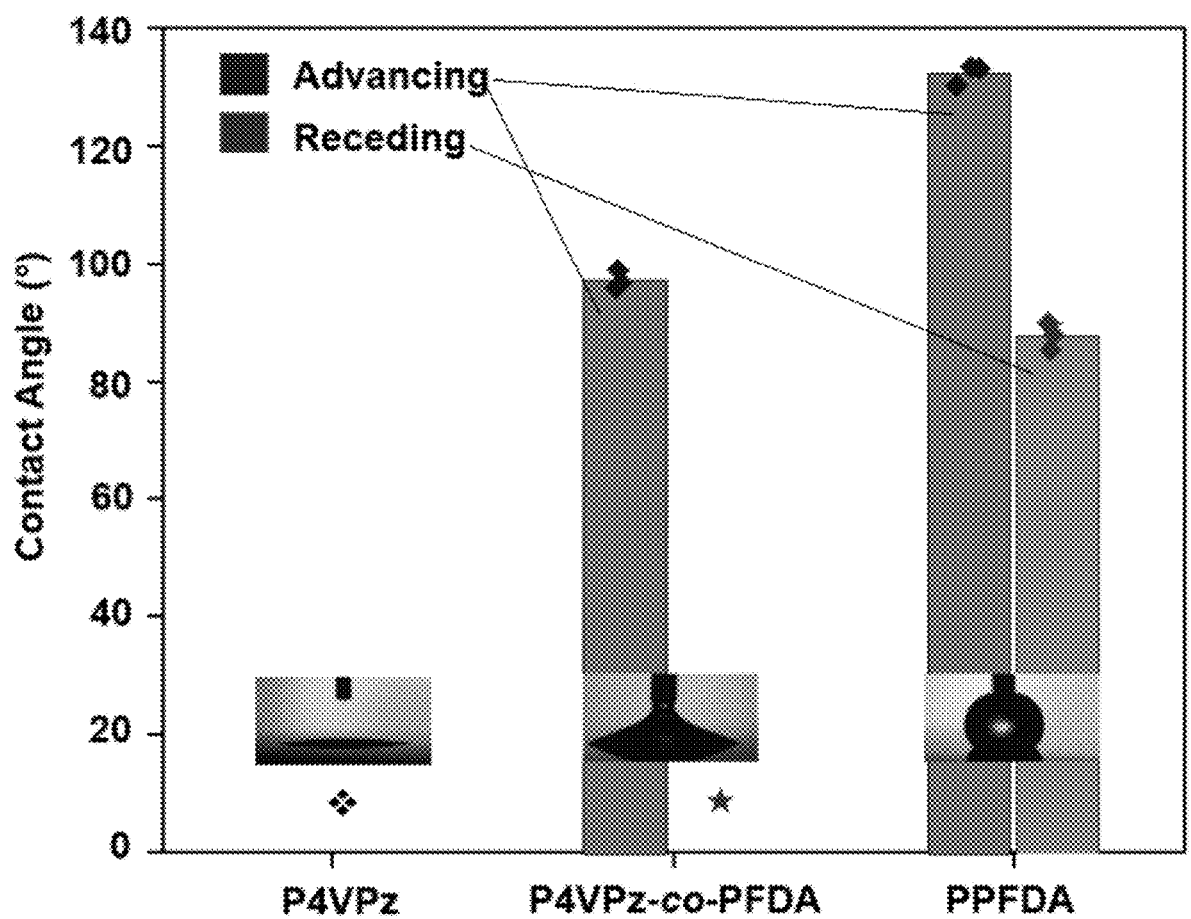
FIG. 5 shows advancing and receding contact angle measurements of the same polymer coatings characterized in FIG. 4 (n=3). Dynamic contact angle measurements were not measurable for the P4VPz coatings due to the high surface energy and loss of contact between the dispensing syringe and droplet (see left inset image). *P4VPz-co-PFDA coatings showed such a large hysteresis that the droplet edge became pinned at the maximum droplet diameter and no receding angle plateau was achieved within a range of droplet volume accessible to the dispensing syringe (see center inset image).

The amphiphilic nature of P4VPz-co-PFDA and the switchable surface energy states were further corroborated using dynamic contact angle measurements (FIG. 5). Upon contact with zwitterionic P4VPz-co-DVB, a 2 μL water droplet spread rapidly across the surface. A droplet of such low contact angle was unable to submerge the dispensing needle for dynamic contact angle measurements. PPFDA exhibits an advancing contact angle of 131.7±1.7° and a receding angle of 87.4±2.2°, confirming the hydrophobicity of this fluorinated polymer. The large contact angle hysteresis (~44°) is likely a result of the lowered receding contact angle due to entrapped water droplets by the considerable surface roughness (FIG. 4).

P4VPz-co-PFDA exhibits an advancing contact angle of 96.9±1.5° and a receding contact angle of close to zero, where the three-phase contact line is pinned to the surface throughout the receding contact angle measurements. The large hysteresis and low receding angle are evidence of the amphiphilic nature of the copolymer, within which the hydrophilic and hydrophobic side chains reorient in response to the ambient conditions. The amphiphilic copolymer preferentially presents zwitterionic groups at the water-solid interface and fluorinated side chains at the air-solid interface, a critical feature for fouling resistance at the three-phase contact line. Angle-resolved XPS (ARXPS) confirmed a slight gradient in comonomer composition that favors PFDA when the surface is exposed to vacuum (~8% difference in PFDA content). That gradient in composition, albeit small, lent support to the hypothesis that the polymer side chains could reorient in response to the environment, leading to reduced biofilm formation at the triple interface. Force balancing at the three-phase contact line thus leads to the pinning of the droplet, preventing it from receding. Therefore, the low receding contact angle captured on P4VPz-co-PFDA provides further evidence of the contrast in surface energy states between water-contacting and air-contacting areas.

That large contact angle hysteresis, combined with the ARXPS results, confirmed the surface chain reorientation in amphiphilic copolymers, which led to reduced biofilm formation at the triple interface. That facile chain reorientation allowed the surface to adopt the most favorable energy state according to the environment, i.e. rich in fluorinated moieties under vacuum during ARXPS and strongly hydrophilic (likely a result of surface-enriched zwitterionic moieties) during receding contact angle measurements.

The evolution of the static contact angle over time was recorded to observe the rate of surface reorientation at the droplet boundary (e.g. the spreading rate) and reversibility of the surface energy after drying. After 15 minutes, the static contact angle decreased by 38.4°, which was attributed to the moving contact line as a result of the facile surface chain reorientation. At the contact line, the surface chains continuously reoriented to equilibrate with the environment and minimize the interfacial energy, leading to surface-concentrated zwitterionic moieties that further enhanced spreading of the droplet. The decreasing contact angle was not a result of evaporation as literature indicated that no appreciable evaporation would occur in 15 minutes for the droplet size applied here (15 μL). After the 15-minute measurement, the surface was dried and static contact angle measured again. Although the contact angle did not fully restore to the value of pristine amphiphilic surfaces, the 5.4° increase in contact angle after drying confirmed the reversibility of the surface chain reorientation, further corroborating the dynamic nature of the surface at the triple interface.

With its distinct molecular-level heterogeneities and the capability of dynamic chain reorientation, the amphiphilic copolymer outperforms the zwitterionic polymer in resisting biofilms of *P. aeruginosa*, which preferably form at the three-phase contact line. Biofilm growth was quantified using the O'Toole protocol, adapted for coated planar substrates. Briefly, *P. aeruginosa* strain PAO1 was selected as the model organism for its abundant TFP appendages (responsible for initiating surface attachment), its known ability to readily produce biofilms, and its tendency to grow more prolifically at the solid-liquid-air interface. P4VPz, P4VPz-co-PFDA, and PPFDA were coated onto 18 mm×18 mm cover slips in a double-sided fashion for biofilm quantification, or onto silicon wafers (single-sided) for electron microscopy. The coated samples were partially submerged for incubation in freshly diluted (1:100) PAO1 culture for 8 hours to allow ample time for biofilm growth, followed by thorough rinsing (with purified water) to remove any loosely attached bacteria that were not associated with a biofilm. The cover slips were then subject to crystal violet staining for a colorimetric quantification of biofilms, whereas silicon wafers were fixed, dried, and imaged using scanning electron microscopy (SEM). Growth of the PAO1 biofilms is most prominent at the solid-liquid-air interface because PAO1 is a motile strain.

Figure 6:
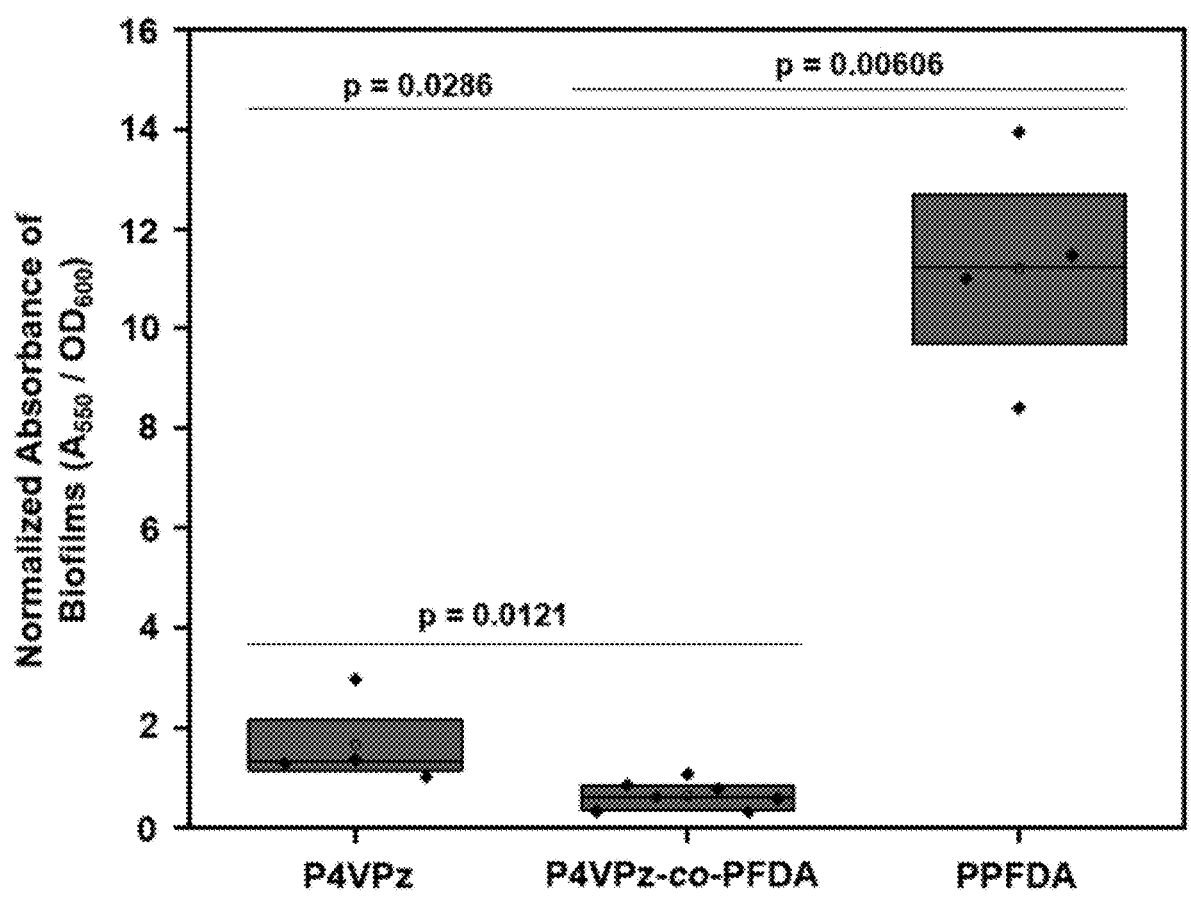
FIG. 6 shows absorbance measurements of crystal violet stained biofilms after 8 hours of growth on polymer-coated samples. Absorbance at 550 nm was divided by the $OD_{600}$ of the culture medium recorded at 8 hours to normalize the biofilm growth by the planktonic bacterial growth to account for variations in the growth conditions.

Crystal violet stains negatively charged components of PAO1 cells and biofilm EPS, and thus the absorbance at 550 nm (corresponding to crystal violet) is directly proportional to the amount of biofilm growth on the samples (FIG. 6). The amount of biofilm was normalized by the $OD_{600}$ of the liquid culture grown in the same culture well to offset any potential variations in culture conditions. Notably, PPFDA incurs substantial PAO1 biofilm formation that is an order of magnitude greater than those captured on zwitterionic and amphiphilic surfaces. It is possible that PAO1 biofilm growth was enhanced on PPFDA because the air bubbles entrapped in the rough surface topography could provide additional three-phase interfaces to sustain biofilm growth. The zwitterionic P4VPz exhibits a stark decrease in biofilm formation (15% that of PPFDA), which is consistent with the well-documented antifouling effects of zwitterionic surfaces. The amphiphilic copolymer P4VPz-co-PFDA further reduces biofilms to 6% that of PPFDA (39% of P4VPz), i.e. the amphiphilic copolymer exhibits the least fouling by biofilms. Although surface roughness has been considered to cause biofouling (like the case of PPFDA), the rougher amphiphilic copolymer (FIG. 4) in fact demonstrates less biofilm growth compared to the zwitterionic polymer. In this case, the effect of surface roughness is outweighed by that of the amphiphilic chemistry on biofilm formation.

Figure 7:
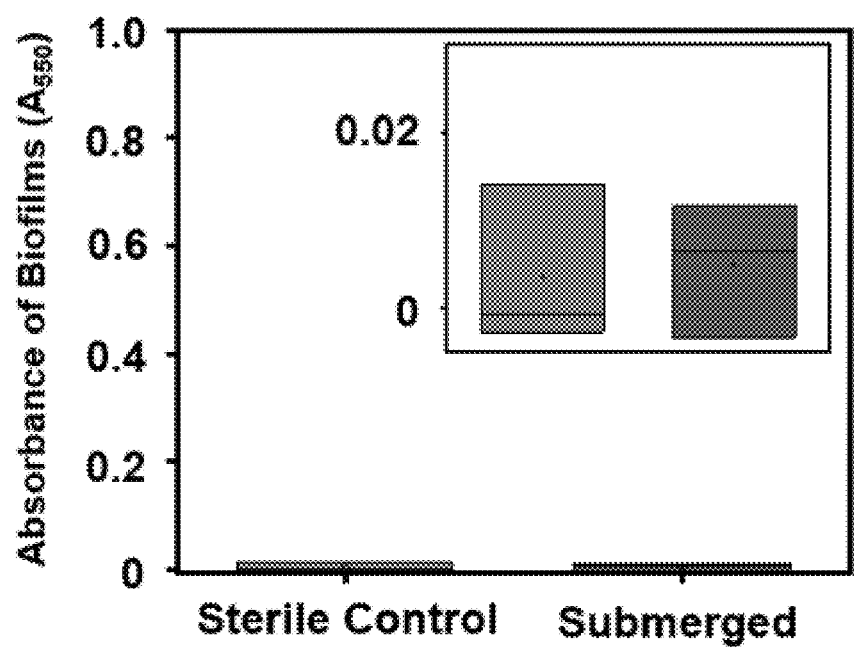
FIG. 7 shows control experiments of P4VPz in sterile medium (left) and submerged in PAO1 cultures below the surface (right) show approximately zero crystal violet staining of non-biofilm components and lack of biofilm growth beneath the solid-liquid-air interface, respectively (n=3). The inset features smaller scale for the y-axis.
Figure 8:
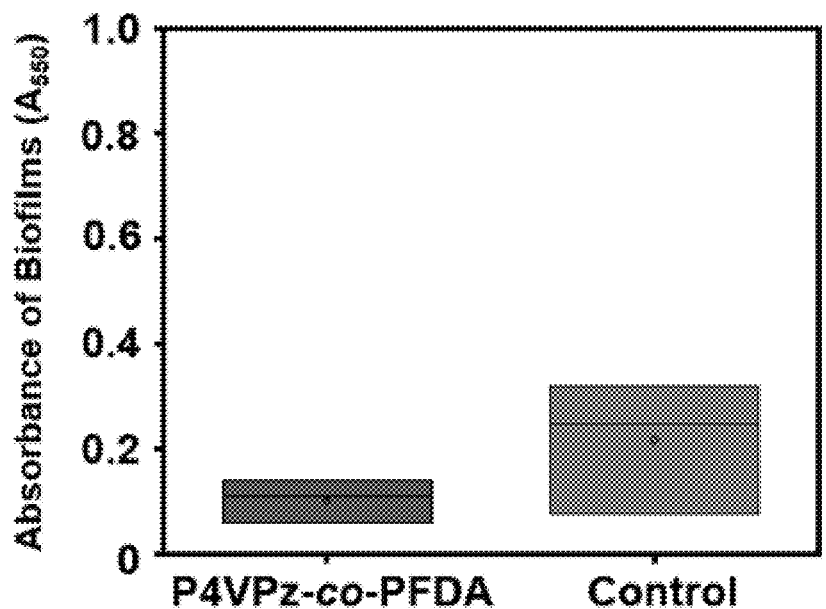
FIG. 8 shows absorbance measurements of biofilms stained with crystal violet after 8 hours of growth on P4VPz-co-PFDA coated and uncoated polyvinyl chloride (PVC) microplates (n=6). In each plot, the box represents the interquartile range, line represents the median, unfilled circle represents the mean, and solid diamonds are the recorded values individual samples.

To ensure the biofilm growth and the antifouling effect is isolated to the solid-liquid-air interface, P4VPz-coated cover slips (selected for the increased fouling compared to P4VPz-co-PFDA) were incubated in PAO1 cultures according to the same procedure as above, but fully submerged below the medium surface. This setup removes any solid-liquid-air interfaces from the system and resulted in undetected biofilm growth (FIG. 7). Staining of the polymer thin films by crystal violet was also determined to be negligible in a control experiment in which no PAO1 was introduced to the culture medium (FIG. 7). An additional experiment compared the biofilm growth atop P4VPz-co-PFDA with a polyvinyl chloride (PVC) control to establish enhanced biofilm resistance of the copolymer versus a material commonly used to make microplates in biofilm experiments (FIG. 8).

Figure 9:
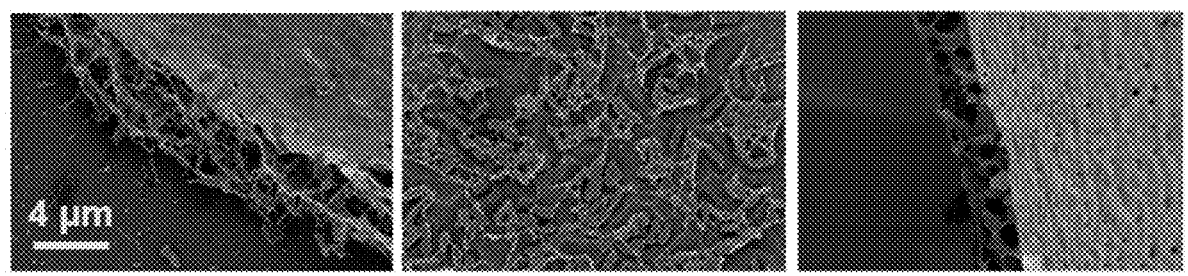
FIG. 9 shows SEM images of biofilms grown for 8 hours on polymer-coated Si wafer samples of P4VPz (left), P4VPz-co-PFDA (middle), and PPFDA (right). PPFDA biofilms exhibit thick, well-developed EPS structure in comparison to a thread-like nature of the EPS on P4VPz and an underdeveloped EPS on P4VPz-co-PFDA.

To gain further insight into the effect of surface chemistry on the structure of biofilms, SEM images of the PAO1 biofilms grown on P4VPz, P4VPz-co-PFDA, and PPFDA were compared (FIG. 9). The structural distinctions signify the stage of biofilm development on each polymer. PPFDA displayed a thick biofilm with dense EPS pervading the entire architecture, whereas biofilms grown on the zwitterionic surface exhibited sparse thread-like EPS. In both cases, the biofilms were thick enough to be lifted from the surface without losing their structural integrity, as seen in FIG. 9. In contrast, biofilms grown on the amphiphilic copolymer displayed large gaps between adjacent colonies and the least developed EPS.

In addition to the switchable surface energy states, we believe that greater fouling resistance of amphiphilic copolymers could also be partially attributed to the molecular heterogeneities. Recent biophysics studies have revealed that biofilm formation is initiated in *P. aeurginosa* by surface sensing and subsequent anchoring of cells to a surface, both of which are accomplished by appendages known as Type IV pili (TFP). TFP (5-8 nm diameter and micrometers long) are extended and retracted from membrane-bound assembly proteins until a surface is encountered. Following surface sensing, microbes are known to initiate surface attachment and secretion of EPS to form a biofilm. Notably for antifouling materials, nanopatterns of mixed hydrophilic and hydrophobic domains, namely amphiphilic surfaces, have inhibited surface attachment of biomolecules that are comparable in size to the width of TFP. The same repulsion of similarly sized biomolecules previously reported is hypothesized to be a possible mechanism behind the enhanced antifouling capability of our novel amphiphilic polymer.

These experiments demonstrate that the amphiphilic polymer P4VPz-co-PFDA can outperform hydration-reliant zwitterionic chemistry in reducing the formation of biofilms at the solid-liquid-air interface. Key to the efficacy of this material is the large surface energy contrast between hydrophilic and hydrophobic comonomers, as well as the molecular-scale heterogeneities, leading to swift surface chain reorientation and thus dynamic surface energy states in response to wetting. That switchable behavior was demonstrated using dynamic contact angle measurements. The large hysteresis and low receding angle were evidence that hydrophilic and hydrophobic side chains reorient in response to the ambient conditions. The amphiphilic copolymer preferentially presents zwitterionic groups at the water-solid interface and fluorinated side chains at the air-solid interface.

The random polymerization that is characteristic of the iCVD technique enabled the synthesis of such amphiphilic polymers that feature molecular-scale heterogeneities, as demonstrated using AFM and XRD, rather than microphase separation, as in the case for most amphiphilic materials. Without the limitations stemming from comonomer/polymer solubility, the all-dry synthesis technique enabled coatings of the amphiphilic polymer at desired composition and thickness. The novel amphiphilic chemistry outperformed its hydrophilic zwitterionic and hydrophobic fluorinated counterparts in resisting biofilm formation at the air-liquid-solid three-phase interface, highlighting the benefit of the switchable surface energy. That fouling resistance is noteworthy also because the zwitterionic chemistry is currently the leading chemistry in antifouling performance.

P4VPz-co-HFBA & P4VPz-co-PFOA

While the P4VPz-co-PFDA amphiphilic copolymer discussed above, comprising a statistical mixture of zwitterionic and fluorinated units, exhibited excellent antifouling performance at the triple interface (it outperformed the conventional zwitterionic chemistry by further reducing biofilm formation at the triple interface by 61% compared to the zwitterionic coating), in some applications, the long-fluorinated side chain could potentially raise concerns regarding bioaccumulation. Accordingly, these examples relate to copolymers having a shorter fluorocarbon side chain.

Two additional types of amphiphilic copolymers, each with molecular heterogeneities of a pyridinium-based zwitterionic monomer and a hydrophobic monomer with a short fluorinated chain [i.e., 1H,1H,2H,2H-perfluorooctyl acrylate (PFOA) and 2,2,3,4,4,4-hexafluorobutyl acrylate (HFBA), respectively], were synthesized using initiated Chemical Vapor Deposition (iCVD). Fineman-Ross analysis demonstrated the formation of random copolymers with a preference of 4VP incorporation during the free radical polymerization performed using iCVD. The antifouling performance remained excellent for the amphiphilic copolymers with short fluorinated side chains, as demonstrated using *Pseudomonas aeruginosa* (PAO1) that is known to form biofilms at the triple interface. Even the amphiphilic copolymer made with HFBA (with three fluorinated carbon atoms) outperformed the zwitterionic coating by 39.2%, evaluated by the quantity of biofilms formed on each surface.

1H,1H,2H,2H-perflurooctyl acrylate (PFOA, with 6 fluorocarbons in the side chain) and 2,2,3,4,4,4-hexafluorobutyl acrylate (HFBA, with 3 fluorocarbons in the side chain) were copolymerized with a zwitterionic repeat unit using the iCVD technique, as discussed below. That selection of hydrophobic monomers was based on the current understanding that short fluorinated chains are benign to the aquatic species as they are unsusceptible to bioaccumulation. Specifically, the degradation products of the fluorocarbon side chains of PFOA and HFBA have shown minimal bioaccumulation in the liver of rats compared to that of perfluorooctanesulfonic acid. While recent evidence hinted that PFOA might cause accumulation in serum. HFBA is known to be non-toxic and remains a safe alternative for producing hydrophobic coatings.

Using the iCVD technique, 4VP-PFOA and 4VP-HFBA copolymers were synthesized at various compositions. Fineman-Ross analysis proved the formation of statistical copolymers without microphase separation, which was further corroborated by scanning electron microscopy (SEM) with energy dispersive x-ray analysis (EDX). *Pseudomonas aeruginosa* (PAO1) was used to test the antifouling performance of the amphiphilic copolymers, which is known to form biofilms at the triple interface. The amphiphilic copolymers with short fluorinated chains demonstrated comparable effectiveness to the state-of-the-art.

Chemicals and Materials

The monomers 4-vinylpyridine (4VP, ≥95%), 2,2,3,4,4,4-hexaflurobutyl acrylate (HFBA, 95%), divinylbenzene (DVB, 80%) and initiator tert-butyl peroxide (TBPO, 98%) were acquired from Sigma-Aldrich without further purification. The monomer 1H,1H,2H,2H-perflurooctyl acrylate (PFOA, 97%) was obtained from Synquest Laboratories. Trichlorovinylsilane (TCVS, 97%) and 1,3-propane sultone (PS, 98%) were acquired from Sigma-Aldrich. The 18 mm×18 mm glass cover slips (12542A, Fisherbrand) were purchased from Fischer Scientific. The silicon (Si) wafer substrates were acquired from Pure Wafer. For biofilm attachment experiments, Crystal Violet (CV, Alfa Aesar), Acetic Acid (AA, 100%, Merck) and Lysogeny Broth (LB, 240230, Difco) were used. Milli-Q unit (Millipore) was used to produce deionized water with a resistivity of 18.2 MΩ cm at 25° C. for all experiments.

Substrate Preparation

Prior to deposition, glass cover slips, and Si wafer were cleaned in a PDC-001-HP plasma cleaner (Harrick Plasma) for 2-3 minutes at pressure below 100 mTorr and high RF setting of 45 W. After this treatment, the substrates were exposed to TCVS under vacuum for 5 minutes to promote adhesion between substrates and copolymer thin films deposited by iCVD.

iCVD Deposition

Figure 10:
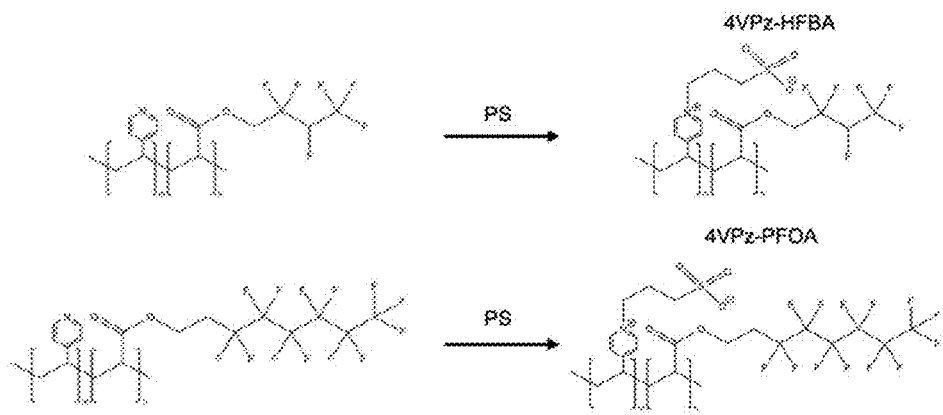
FIG. 10 shows the reaction of 1,3-propane sultone with 4VP-HFBA and 4VP-PFOA copolymers.

The schemes for 4VP-HFBA and 4VP-PFOA copolymers are depicted in FIG. 10. The copolymers as well as their homopolymers were deposited in the custom-built reactor with 2.5 cm thick glass lid to allow in-situ laser interferometry (He—Ne laser, JDSU, USA) for visual observation and coating thickness control (200 nm for one full cycle). The pressure was maintained at the specified set point by a throttle butterfly valve (MKS Instruments, USA), and it was measured by a manometer (Baratron, MKS Instruments, USA). The stage temperature was set by Accel 500 LC chiller (Thermo Fisher, USA) and measured by type K thermocouple (Omega Engineering, USA). The TBPO initiator decomposition was enabled by the filament array, which consisted of copper/nickel wires (2.8 cm above the stage) that were resistively heated by a DC power supply (B&K Precision, USA). The filament temperature was measured by type K thermocouple. For 4VP-HFBA depositions, the deposition conditions are summarized in Table 3. The reactor pressure was maintained at 1.1 Torr. Both monomers were fed into the reactor through needle valves (Swagelok, USA), and the monomer jar temperatures were maintained at 50 and 25° C., respectively. The flow rate range for 4VP (vapor pressure of 1.68 Torr at 25° C.) was 0.1 to 3.0 sccm, while HFBA (vapor pressure of 3.5 Torr at 25° C.) flow rate was 1.5 to 2.5 sccm. The initiator was kept at room temperature and delivered into the reactor at 1 sccm through the mass flow controller (MKS Instruments, USA). The total flow rate was kept constant at 7.0±0.1 sccm to maintain same residence time in the reactor. The filament temperature was maintained at 250° C., while the stage temperature was fixed at 27.1±2.9° C. The monomer feed gas fraction ($f_{4VP}$) was calculated at the surface by correcting the monomer partial pressure of 4VP in the feed by its saturated vapor pressure.

Similarly, Table 4 shows the summary of deposition conditions for 4VP-PFOA. The reactor pressure was kept at 0.25 Torr to avoid condensation due to lower vapor pressure of PFOA (0.332 Torr at 25° C.).[37] PFOA was heated to 60° C. and metered through a needle valve. The total flow rate was kept constant at 1.2±0.1 sccm. The filament temperature was maintained at 250° C., while the stage temperature was kept at 28.1±1.1° C. To compare the performance of amphiphilic thin films (4VP-HFBA and 4VP-PFOA) to conventional zwitterionic coating, zwitterionic 4VP films cross-linked with DVB were synthesized (4VPz-DVB).

TABLE 3

The flow rates for 4VP-HFBA copolymer depositions. $f_{4VP}$ represents the 4VP monomer gas fraction at the substrate surface.

| 4VP flow rate (sccm) | HFBA flow rate (sccm) | TBPO flow rate (sccm) | Argon flow rate (sccm) | $f_{4VP}$ (%) |
|---|---|---|---|---|
| 0.15 | 2.45 | 1.0 | 3.4 | 10.8 |
| 0.2 | 2.0 | 1.0 | 3.8 | 17.9 |
| 0.5 | 2.5 | 3.0 | 1.0 | 28.9 |

TABLE 3-continued

The flow rates for 4VP-HFBA copolymer depositions. $f_{4VP}$ represents the 4VP monomer gas fraction at the substrate surface.

| 4VP flow rate (sccm) | HFBA flow rate (sccm) | TBPO flow rate (sccm) | Argon flow rate (sccm) | $f_{4VP}$ (%) |
|---|---|---|---|---|
| 1.0 | 2.0 | 1.0 | 3.0 | 49.8 |
| 2.0 | 2.0 | 1.0 | 2.0 | 66.4 |
| 3.0 | 1.5 | 1.0 | 1.5 | 80.0 |

TABLE 4

The flow rates for 4VP-PFOA copolymer depositions.

| 4VP flow rate (sccm) | PFOA flow rate (sccm) | TBPO flow rate (sccm) | Argon flow rate (sccm) | $f_{4VP}$ (%) |
|---|---|---|---|---|
| 0.3 | 0.3 | 0.5 | 0.2 | 16.8 |
| 0.3 | 0.2 | 0.5 | 0.2 | 30.3 |
| 0.6 | 0.2 | 0.5 | 0 | 33.9 |
| 0.5 | 0.1 | 0.5 | 0.2 | 52.4 |

Vapor-Phase Derivatization

The schemes for the subsequent vapor-phase derivatization of 4VP-HFBA and 4VP-PFOA copolymers are shown in FIG. 10. After iCVD deposition, the copolymer coated substrates were exposed to PS to make pyridine-based sulfobetaine zwitterionic functional groups. 1 g of PS was added to the crystallizing dish (VWR), while the specimens were fixed on the top of the dish. The dish was placed into the vacuum oven (VivTek, FVL-A30) at 60° C. for 6 hours.

Characterization

Thickness of the thin films on flat Si wafer substrates was measured by a J. A. Woollam Alpha-SE ellipsometer (Lincoln, NE) at the incidence angles of 65°, 700 and 750 using 190 wavelengths from 315 to 718 nm. The Cauchy-Urbach model was used to fit the data. Fourier-transform infrared (FTIR) spectroscopy Bruker Vertex V80V (Billerica, MA) with cooled mercury cadmium telluride (MCT) detector was used to find out the composition of thin films. The spectra were obtained from 450 to 4000 $cm^{-1}$ with 4 $cm^{-1}$ resolution and total scans of 128. The background spectrum of Si wafer was subtracted from all samples, and the baseline was corrected by using OriginLab (Northampton, MA). Then, the spectra were normalized to the film thickness of a sample. X-ray photoelectron spectroscopy (XPS) was done by using Scienta Omicron ESCA 2SR (Denver, CO) under ultra-high operating pressure of $1'10^{-9}$ Torr. X-rays were generated from Al Kα at 300 W (15 kV; 20 mA) with analysis spot size of 2 mm in diameter. The flood gun was used to neutralize nonconductive copolymer samples. Survey as well as high-resolution N(1s) and C(1s) scans were collected for all samples. The analysis of the spectra to determine film composition and correct background was performed by CasaXPS software. Asylum MFP-3D (Goleta, CA) Atomic Force Microscope (AFM) was used to measure the surface roughness in AC air tapping mode. At least two images at different locations were taken by scanning 5×5 μm regions at frequency of 0.5 Hz. Dynamic contact angles, i.e. advancing and receding, were measured with the sessile drop method by using a goniometer equipped with automatic dispenser (Model 500, Rame-Hart). The droplet was of 1 μL was deposited on the surface and increased up to 10 μL, then it was retracted. The advancing contact angle ($\delta_A$) was recorded as the maximum angle during the increment of drop size, while receding angle ($\delta_R$) was the angle, at which the baseline recedes while the volume was reduced from 10 to 3 μL. At least three measurements were performed on each sample, and averages were reported. The bond length of hydrophobic chains was estimated by using ChemBio-Draw Chem 3D suite. Lastly, SEM-EDX was conducted by using Zeiss Gemini 500 SEM (Oberkochen, Germany) to get x-ray elemental mapping. Prior to the observation, the samples were coated with 15 nm of gold. The x-ray maps were collected at voltage of 1 eV using HE-SE2 scope with pixel dwell time of 5000 μs and frame count of 1.

Bacterial Adhesion Experiments

Figure 11:
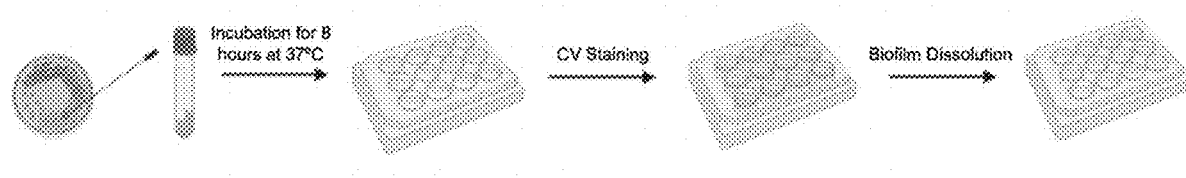
FIG. 11 shows a schematic of the experimental steps for testing bacterial adhesion.

The procedure for biofilm attachment experiments was adopted from the previous study and the schematic of the main experimental steps is shown in FIG. 11. PAO1 strain of *P. aeruginosa* was used for experimental validation. A single colony of PAO1 was added to 5 ml of LB medium and incubated overnight until $OD_{600}$ measurement reaches 0.5-0.6. The absorbance was measured by Tecan Infinite M1000 PRO. Then, this culture media was diluted 1:100. 12-well plate (3513, Corning) with attached coated cover slips was exposed to ultra-violet for disinfection for at least 30 minutes. 3 mL of diluted culture media was added to each well along with a few LB control wells. The lid with cover slips was placed on top of the well plate, and then incubated for 8 hours at 37° C. After the incubation, the cover slips were washed with Mill-Q water, and then submerged into 0.5 wt. % solution of CV for 15 minutes. The samples were dried overnight, and then submerged into 33% of AA for 15 minutes to remove the stained biofilm. Finally, the $OD_{550}$ was recorded for each sample as well as a few samples of AA for background correction.

Synthesis of Copolymer Thin Films

The all-dry synthesis approach, primarily iCVD, was employed to synthesize amphiphilic copolymer thin films. iCVD is a solvent-free free-radical polymerization technique, which is known for its conformality, versatility, substrate-independence, and nanoscale thickness control. iCVD allows to deposit a large library of functionalities including hydrophilic and hydrophobic, hence creating amphiphilic coatings for antifouling application on any kind of substrate. iCVD enables synthesis of amphiphilic copolymers with molecular heterogeneities, which can aid in studying bacteria-surface interactions.

During iCVD, the monomer(s), inert gas and initiator are metered into the reactor chamber under medium vacuum. After that, the physisorption of monomer(s) happens at the cooled substrate.

Once the filament array is turned on, TBPO decomposes to form free radicals. Finally, once the radicals chemisorb to the surface-adsorbed monomers, the free-radical polymerization begins following Eley-Rideal mechanism. The sulfobetaine-based amphiphilic copolymers were fabricated by performing post-modification reaction with PS, in which primary amine was converted to quaternary ammonium group.

The homopolymers P4VP, PHFBA, PPFOA, 4VP-HFBA and 4VP-PFOA copolymer thin films were deposited by using iCVD. The conformality and monomer gas fraction, $f_{4VP}$, were adjusting by changing $P_m/P_{sat}$, which is the ratio of monomer partial pressure over its saturated pressure at the specific stage temperature. Hence, $P_m/P_{sat}$ is indicative of monomer surface concentration. All copolymers had $P_{4VP}/P_{sat}$ range 0.01-0.15 to avoid condensation and preserve coating conformality.

Chemical Characterization of the Copolymer Thin Films

Figure 12:
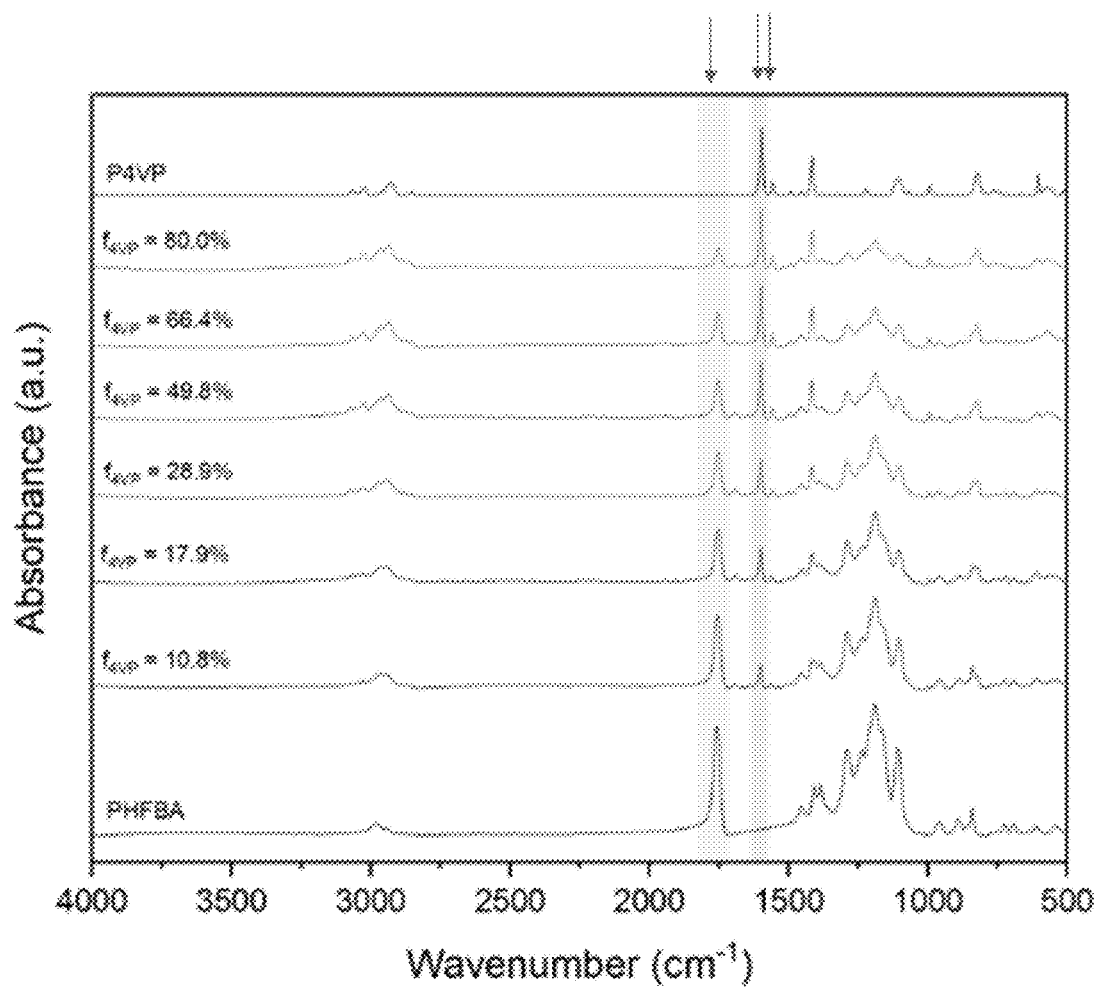
FIG. 12 shows Fourier-transform infrared spectroscopy (FTIR) of 4VP-HFBA copolymers with different 4VP gas fractions ($f_{4VP}$) and their homopolymers. The characteristic adsorption of HFBA (single arrow) corresponds to C=O peak located at 1757 cm$^{-1}$. The characteristic adsorption of 4VP (double arrows) corresponds to peak due to the pyridine ring located at 1599 cm$^{-1}$.

Successful obtainment of 4VP-HFBA and 4VP-PFOA copolymers was confirmed by using FTIR and XPS. The FTIR spectra of homopolymers PHFBA and P4VP, and their copolymers with varying monomer gas fractions, $f_{4VP}$, were depicted in FIG. 12. The spectra for all samples were baseline corrected and normalized by film thickness. In FIG. 12, one of the characteristic peaks for PHFBA was the C=O stretching located at 1757 $cm^{-1}$. The absorption in the range of 1292 to 1190 $cm^{-1}$ corresponded to the symmetric and asymmetric vibration of the $CF_2$ moiety, and the sharp peak at 1109 $cm^{-1}$ corresponded to the $CF_3$ end group. The characteristic peaks for the P4VP homopolymer included the vibrations due to the pyridine ring, from 1597 $cm^{-1}$ to 1415 $cm^{-1}$, confirming the successful incorporation of 4VP into the polymer films, and the broad absorption at around 3000 $cm^{-1}$, corresponding to alkyl C—H bonds. The spectra of 4VP-HFBA copolymers, with the 4VP composition ranging from 10.8 to 80.0%, were also shown in FIG. 12. Presence of the characteristic absorptions of both the pyridine ring (at 1599 $cm^{-1}$) and the carbonyl group (at 1757 $cm^{-1}$) suggested incorporation of both 4VP and HFBA through the all-dry polymerization technique. It is also important to note that, there was a slight shift in the peak position of the carbonyl group, i.e., from 1757 (for homopolymer PHFBA) to 1753 $cm^{-1}$ (for the copolymers), confirming successful copolymerization rather than physically mixing the homopolymers.

Figure 13:
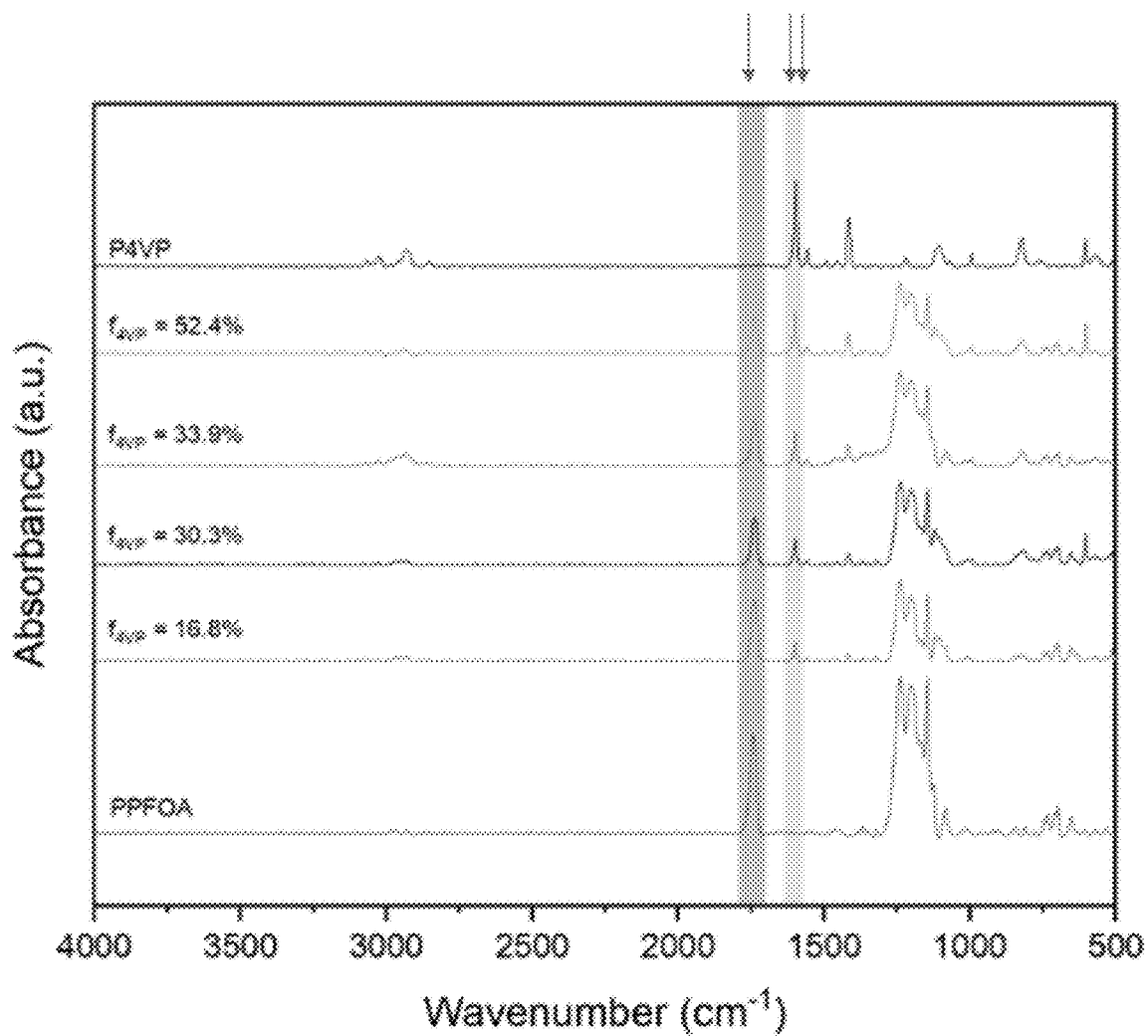
FIG. 13 shows FTIR of homopolymers of 4VP and PFOA, and their copolymers with various gas fractions ($f_{4VP}$). The characteristic adsorption of PFOA (single arrow) corresponds to C=O peak located at 1743 cm$^{-1}$. The characteristic adsorption of 4VP (double arrow) corresponds to peak due to the pyridine ring located at 1597 cm$^{-1}$.

Similarly, FIG. 13 shows the FTIR spectra of 4VP-PFOA copolymers, with $f_{4VP}$ ranging from 16.8 to 52.4%, and the corresponding homopolymers. PPFOA absorption peaks consist of carbonyl group (C=O) stretching at 1744 $cm^{-1}$ and the asymmetric and symmetric stretching of $CF_2$ at 1238 and 1203 $cm^{-1}$, respectively. Like PHFBA, there is a strong peak at 1146 $cm^{-1}$ due to the $CF_3$ end group. 4VP-PFOA copolymers have characteristic peaks of both PFOA at 1740 $cm^{-1}$ and 4VP at 1599 cm-1 with C=O shift from 1744 (for homopolymer PPFOA) to 1740 $cm^{-1}$ (for the copolymers), confirming copolymerization of 4VP-PFOA via iCVD.

The molar fraction of each co-monomer (e.g., $F_{4VP}$) in the copolymer (i.e., after the polymerization reaction) differed from the feed composition (e.g., $f_{4VP}$) due to different reactivities of each monomer. To calculate film composition (e.g., $F_{4VP}$) from FTIR, Beer-Lambert law was utilized with the assumption that the molar adsorption coefficients of the same characteristic peaks were the same irrespective of homopolymers or copolymers. Specifically, the copolymer compositions were calculated using the area-under-the-peak of, e.g., the absorption at 1599 $cm^{-1}$ for the pyridine ring and the absorption at 1740-1757 $cm^{-1}$ for the carbonyl group. From FTIR, the molar fraction for 4VP was calculated to be in the range of 35.4 to 85.1% for copolymers of 4VP-HFBA, and 43.9 to 65.6% for copolymers of 4VP-PFOA (see Table 5).

TABLE 5

Comparison of compositions of copolymer thin films obtained from FTIR and XPS.

| Copolymer | $f_{4VP}$ [%] | $F_{4VP}$ (XPS) [%] | $F_{4VP}$ (FTIR) [%] | % Difference |
|---|---|---|---|---|
| 4VP-HFBA | 10.8 | 39.8 | 35.4 | 4.4 |
| 4VP-HFBA | 12.8 | 48.0 | 44.3 | 3.7 |
| 4VP-HFBA | 17.9 | 55.2 | 51.5 | 3.7 |
| 4VP-HFBA | 29.8 | 63.2 | 57.8 | 5.4 |
| 4VP-HFBA | 49.8 | 76.3 | 70.8 | 5.5 |
| 4VP-HFBA | 66.4 | 81.1 | 77.8 | 3.3 |
| 4VP-HFBA | 80.0 | 90.5 | 85.1 | 5.4 |

TABLE 5-continued

Comparison of compositions of copolymer thin films obtained from FTIR and XPS.

| Copolymer | $f_{4VP}$ [%] | $F_{4VP}$ (XPS) [%] | $F_{4VP}$ (FTIR) [%] | % Difference |
|---|---|---|---|---|
| 4VP-PFOA | 16.8 | 41.9 | 43.9 | 2.0 |
| 4VP-PFOA | 30.3 | 51.9 | 45.4 | 6.5 |
| 4VP-PFOA | 33.9 | 54.0 | 49.6 | 4.4 |
| 4VP-PFOA | 52.4 | 67.1 | 65.6 | 1.5 |

To confirm chemical composition, XPS survey scans of 4VP-HFBA and 4VP-PFOA copolymer thin films with varying $f_{4VP}$ were collected. All spectra captured C at 287 eV, O at 533 eV, N at 400 eV and F at 690 eV. Composition of the copolymer thin films was calculated using the ratio of the atomic percentage (at. %) of fluorine to that of nitrogen (see Supporting Information for details). The surface compositions (because XPS is a surface-sensitive technique) of 4VP-HFBA copolymers were calculated to be in the range of 39.8-90.5%, with a difference from those calculated using the FTIR spectra that was up to 5.5% (see Table 5). Similarly, compositions of the 4VP-PFOA copolymers were calculated using the XPS results (Table 5), which was up to 6.5% different from the composition obtained using the FTIR results. The composition results calculated using XPS were utilized in all subsequent analyses because surface composition is the key in antifouling applications.

Figure 14A:
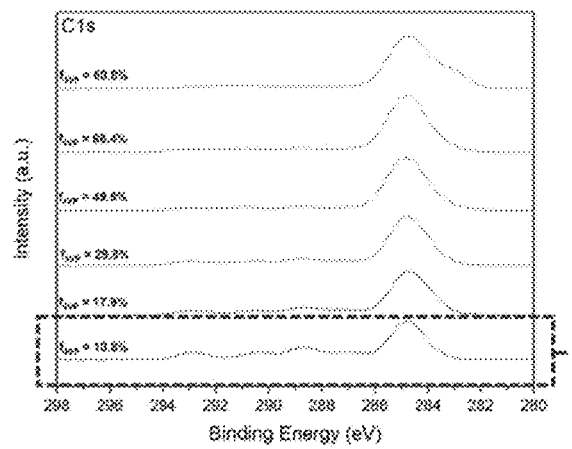
FIGS. 14A-D show X-ray photoelectron spectroscopy (XPS) high resolution CIs spectra for (FIG. 14A) 4VP-HFBA copolymer thin films with varying $f_{4VP}$.
Figure 14B:
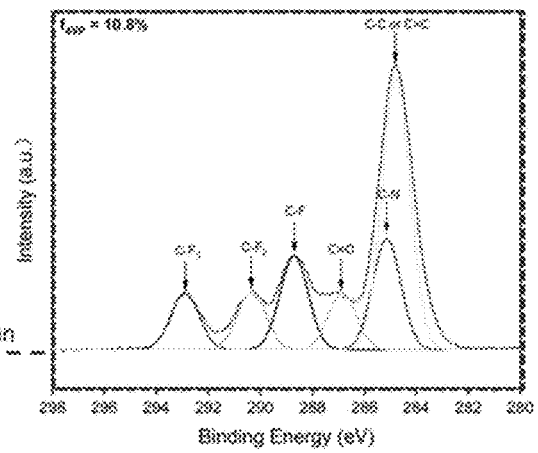
Figure 14C:
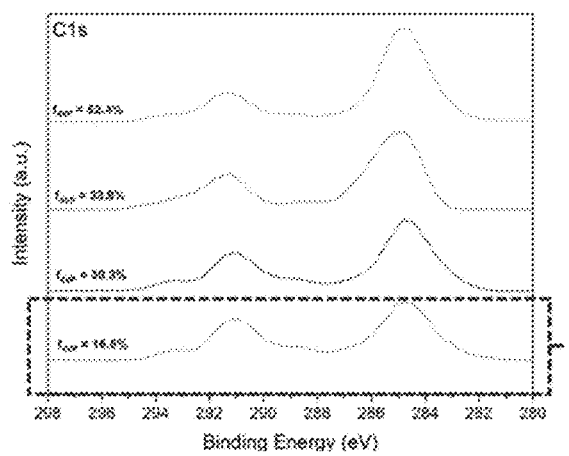
Figure 14D:
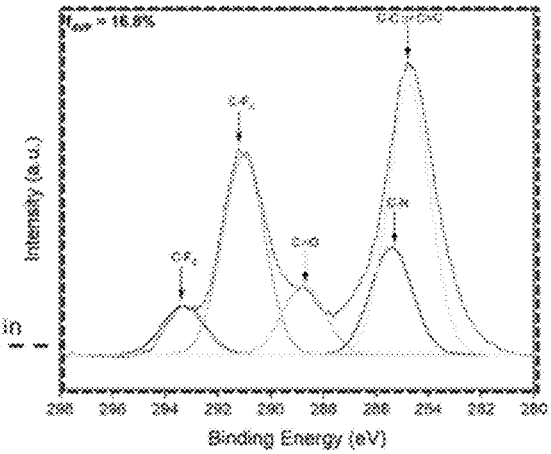

The high-resolution C(1s) spectra of the 4VP-HFBA copolymer thin films were shown in FIG. 14A, with peak deconvolution shown in FIG. 14B, using the copolymer with $f_{4VP}$=10.8% as an example. The high-resolution C(1s) spectra of 4VP-HFBA copolymers can be fitted with seven characteristic peaks, located at 292.9, 290.4, 288.8, 285.6, 285.1 and 284.8 eV, corresponding to C—F$_3$, C—F$_2$, C—F, C=O, C—N and C=C or C—C, respectively (FIG. 14B). With increasing 4VP content, the intensity of C—F$_x$ peaks decreased, confirming the decreasing amount of HFBA in the copolymers. The high-resolution C(1s) spectra of the 4VP-PFOA copolymer thin films and their peak deconvolution were shown in FIG. 14C and FIG. 14D, respectively. The characteristic binding energies at 293.3, 291.1, 288.8, 285.4, and 284.8 eV, corresponded to C—F$_3$, C—F, C=O, C—N and C=C, and C—C, respectively. The slight difference in binding energies can be explained by the different chemical bonding environment of the carbon atoms in 4VP-PFOA in comparison to 4VP-HFBA, i.e., absence of C—F bond and additional C—C bond before the fluorinated chain.

Hence, copolymer thin films of 4VP-HFBA and 4VP-PFOA were obtained via iCVD, the chemical composition of which can be adjusted in a wide range simply by varying the flow rate of each monomer.

Fineman-Ross Copolymerization Analysis

To demonstrate that the amphiphilic copolymers, i.e., 4VP-HFBA and 4VP-PFOA, were truly statistical copolymers with molecular heterogeneities, reactivities of each co-monomer were determined using Fineman-Ross copolymerization analysis.

Figure 15A:
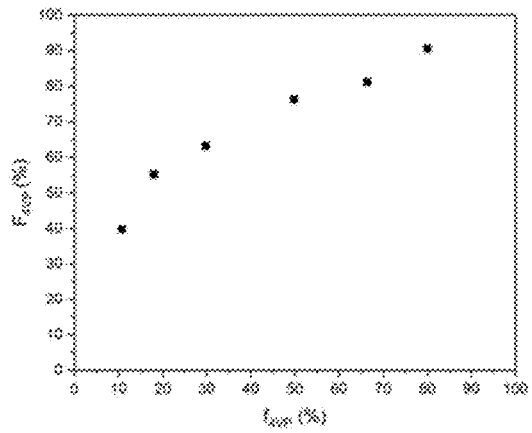
FIGS. 15A-D show copolymer analysis of 4VP-HFBA and 4VP-PFOA. Plot of the 4VP molar fraction ($F_{4VP}$) as a function of gas fraction at the substrate surface ($f_{4VP}$) for (FIG. 15A) 4VP-HFBA and (FIG. 15B) 4VP-PFOA copolymers. Fineman-Ross copolymerization plot for (FIG. 15C) 4VP-HFBA and (FIG. 15D) 4VP-PFOA copolymer thin films.
Figure 15B:
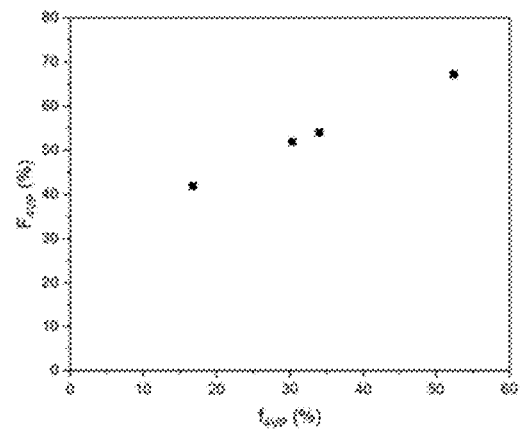

The film compositions, illustrated using F$_4$vP that was obtained from XPS, were correlated with the surface monomer compositions, illustrated using $f_{4VP}$ (FIG. 15A and FIG. 15B). Interestingly, the compositions of 4VP in the copolymer thin films were slightly greater than that among the surface-adsorbed monomers, hinting at a preference for incorporation of 4VP into the copolymer than that of HFBA or PFOA. Fineman-Ross equation was used to correlate the film compositions with the surface monomer compositions, as follows:

$$\frac{f_{4VP}(1-2F_{4VP})}{F_{4VP}(1-f_{4VP})} = +r_{HFBA\ or\ PFOA} + r_{4VP}\frac{f_{4VP}^2(F_{4VP}-1)}{F_{4VP}(1-f_{4VP})^2} \quad [1]$$

where $r_{4VP}$ and $r_{HFBA\ or\ PFOA}$ were the reactivity ratios of 4VP and of HFBA or PFOA, respectively, which were obtained via linear regression of the data shown in FIG. 15A and FIG. 15B, as discussed below.

Figure 15C:
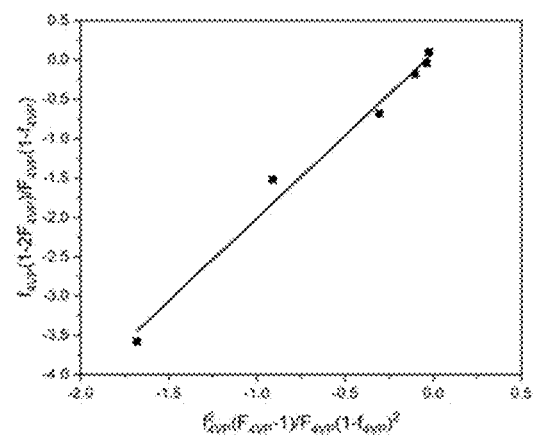

The plot for Fineman-Ross copolymerization equation for the copolymers 4VP-HFBA (FIG. 15C) was used to determine the reactivity ratios of 4VP and HFBA to be 2.10 and 0.09 ($R^2$=0.99), respectively, under the conditions detailed in Table 3. Here, 4VP prefers to react with itself because $r_{4VP}$=2.10, while $r_{HFBA}$ of 0.09 indicates that HFBA prefers to react with 4VP over another HFBA monomer. This preference of 4VP addition can be explained its compact size and reduced steric hindrance. The product of reactivities, $r_{4VP}r_{HFBA}$=0.19, suggests that iCVD polymerization follows a random behavior, implying that the monomer residues are located randomly in the polymer molecule. These reactivities can be compared to those for liquid phase free radical polymerization by using Q-e scheme. This scheme allows to predict monomer reactivities by looking up values for monomer resonance stabilization, $Q_m$, and measure of monomer polar properties, $e_m$. For 4VP, $Q_{4VP}$ was estimated to be 1.00 and $e_{4VP}$ was −0.28, while for HFBA these parameters were estimated to be the same as 2,2,3,4,4,4-hexafluorobutyl methacrylate (HFBMA), due to unavailability of the data for HFBA ($Q_{HFBMA}$=1.70, $e_{HFBMA}$=1.24). Hence, the resultant predicted value for $r_{4VP}$ is 0.38, while $r_{HFBA}$ is 0.26 for liquid-phase free radical polymerization. These values still depict slight preference of 4VP addition with formation of random copolymers and comparable values for $r_{HFBA}$. However, the larger reactivity for 4VP obtained from iCVD experiments can be explained by different reactivities between acrylate and methacrylates, and 4VP having higher preference to add itself in the vapor phase rather than in the liquid-phase due to difference in kinetic rate constants of the iCVD medium vacuum and solution-phase polymerization.

Figure 15D:
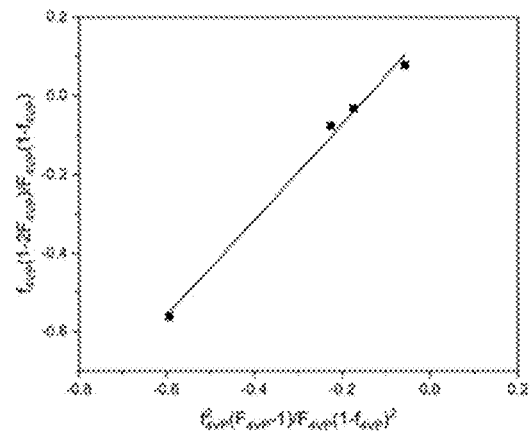

FIG. 15D shows the Fineman-Ross copolymerization plot for 4VP-PFOA copolymers. From the plot, the reactivity ratios of 4VP and PFOA were determined to be 1.22 and 0.17 ($R^2$=0.99), indicating formation of random copolymers with preference of 4VP addition like 4VP-HFBA copolymer thin films. The lower value for $r_{4VP}$ for 4VP-PFOA copolymers uncovers that longer fluorinated side chain incorporates more easily into copolymers than monomers with shorter chain like HFBA. Hence, it was possible to obtain random heterogeneous copolymers via iCVD with reactivities that are comparable to solution-phase polymerization. The novel iCVD 4VP-HFBA and 4VP-PFOA overcome the common problems of amphiphilic block copolymers, like microphase separation and difficulty of common solvent selection, made via liquid-phase free radical polymerization.

Surface Topography and Formation of Nanodomains

To characterize surface topography, AFM was used in AC air mode.

Homopolymers were extremely smooth with RMS roughness below 0.5 nm confirming conformality of iCVD technique and absence of crystallization of PHFBA. Interestingly, for 4VP-HFBA copolymers root mean square (RMS) roughness was about the same magnitude with composition of 39.8, 63.2 and 90.5% 4VP as the homopolymers, while the copolymers with 76.3 and 81.1% had the largest surface roughness exceeding 1 nm. Hence, iCVD demonstrated formation of extremely smooth amphiphilic copolymers, in which the monomers with opposite surface energies were incorporated.

The iCVD amphiphilic copolymer thin films are known to have compositional heterogeneity at the nanoscale, which could be revealed through observation of nanodomains. The standard deviation was 4.84° indicating potential existence nanodomains with size smaller than <1-2 nm$^2$ in comparison with the previous study. 4VP-HFBA and 4VP-PFOA samples were further observed by using SEM-EDX. From x-ray mapping with C, O, N and F series for 4VP-HFBA copolymer, it could be clearly observed that the hydrophilic and hydrophobic parts were distributed randomly confirming the results from Fineman-Ross analysis. From x-ray mapping for 4VP-PFOA, as expected, larger amount of fluorine was observed in F series.

Formation of Zwitterionic Moieties

Figure 16A:
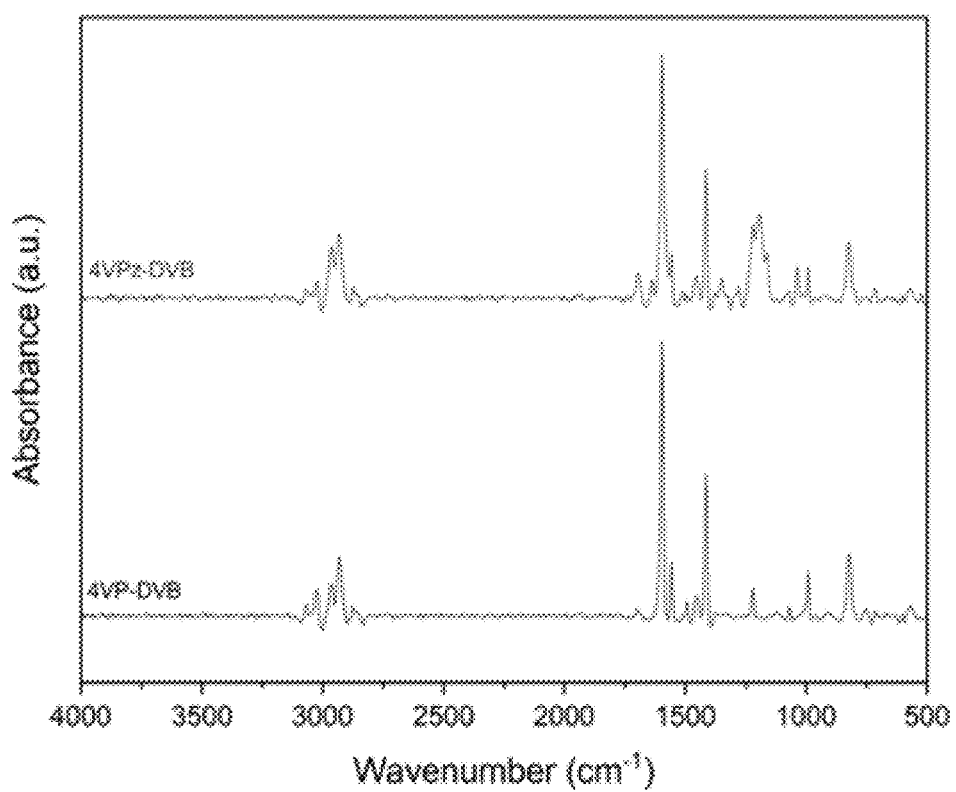
FIGS. 16A-F show chemical and topographical characterization of formation of zwitterionic moieties in the amphiphilic copolymers. FTIR spectra of copolymer before and after PS reaction for (FIG. 16A) 4VP-DVB, (FIG. 16B) 4VP-HFBA and (FIG. 16C) 4VP-PFOA. AFM 3D height retrace of a 5×5 μm view of iCVD polymer coatings of (FIG. 16D) 4VPz-DVB, (FIG. 16E) 4VPz-HFBA and (FIG. 16F) 4VPz-PFOA. The RMS surface roughness is shown under each image. Data=Mean±SD, n=2.
Figure 16B:
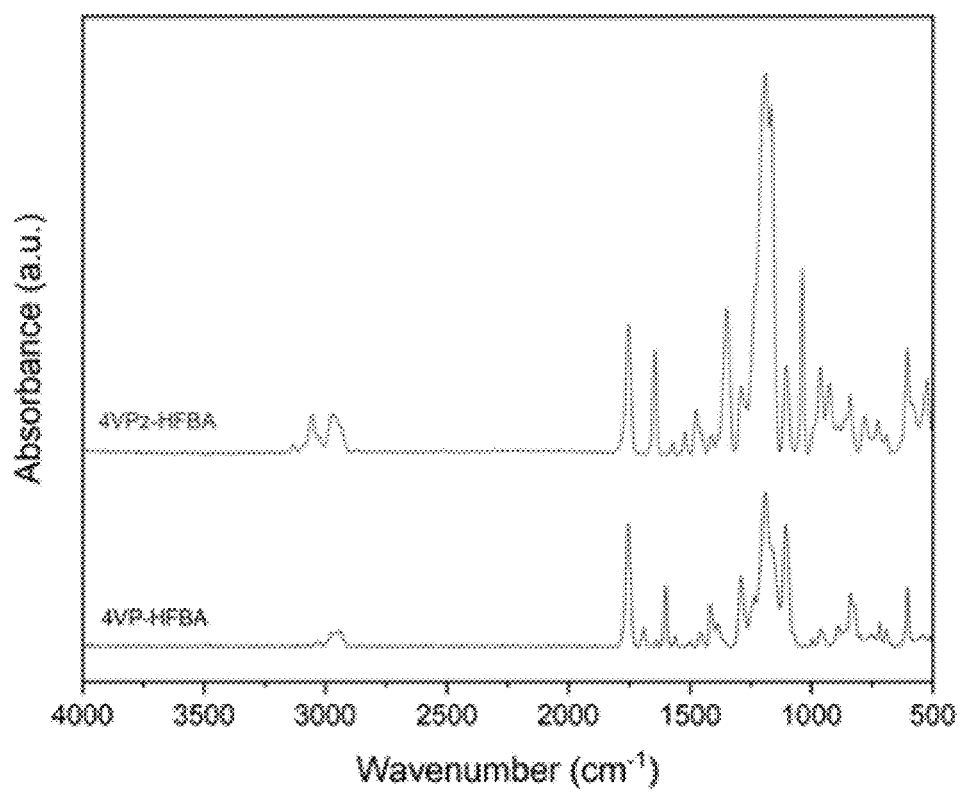
Figure 16C:
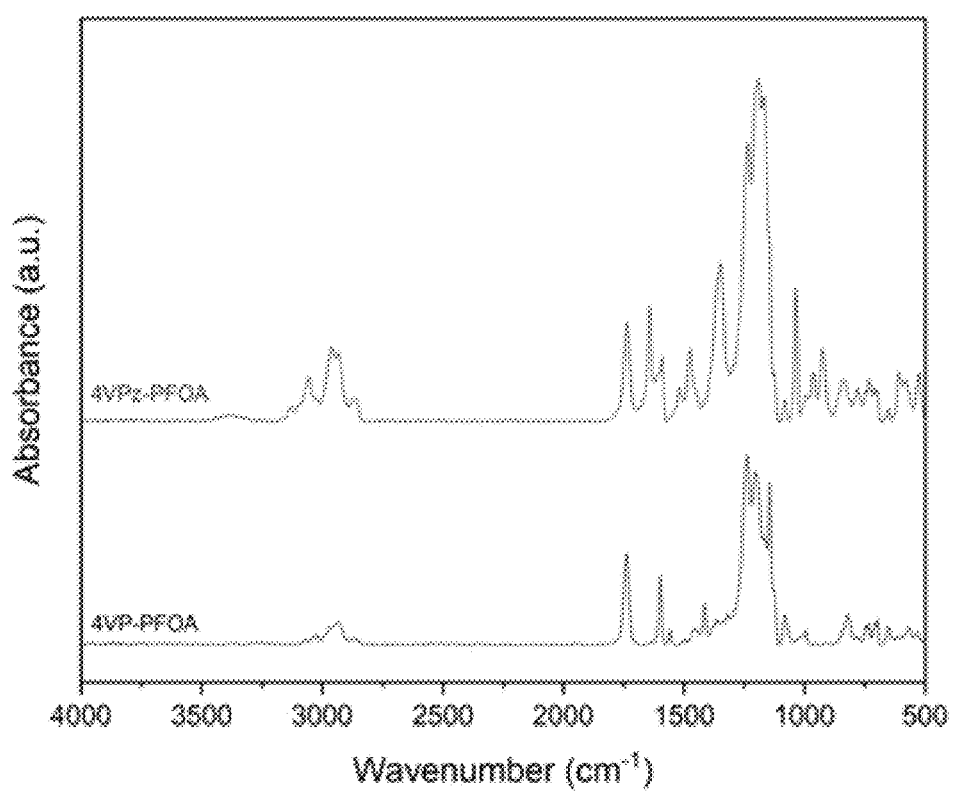

4VP is well-known for its ability to produce zwitterionic moieties via vapor-phase reaction with PS. The reaction proceeds through a ring-opening reaction, in which the pyridine nitrogen gets quaternized and sulfobetaine group is formed. It is beneficial to have amphiphilic copolymers with zwitterionic groups to make the antifouling mechanism better in the liquid-solid interface due to formation of extremely strong hydration layer, which will prevent the settlement of foulants. To confirm that PS reaction was successful, the FTIR and XPS high resolution N(1s) spectra were collected before and after the reaction. FIG. 16A depicts FTIR spectra for 4VP-DVB (92.5% 4VP) copolymer and its zwitterionic derivative. Formation of new peaks was observed at 1194 and 1036 cm$^{-1}$, which correspond to sulfobetaine SO$_3^-$ group. In addition, a new peak at 1641 cm$^{-1}$ was formed due to quaternization of tertiary amine. For vapor phase PS reaction, the amphiphilic copolymers were synthesized with composition of around 50% of each monomer to promote even distribution of nanodomains as well as prevent solubility of a coating in the liquid media. FIG. 16B depicts amphiphilic 4VP-HFBA (48% 4VP) and its zwitterionic derivative. Similarly, new peaks at 1037 cm$^{-1}$ corresponded to SO$_3^-$, and respective shift of pyridine ring peak shift from 1601 to 1645 cm$^{-1}$ indicated that all nitrogen was fully quaternized. FIG. 16C depicts amphiphilic 4VP-PFOA (54% 4VP) and 4VPz-PFOA. Equivalent to 4VP-HFBA, the completeness of reaction was confirmed through the formation of sulfobetaine peak at 1037 cm$^{-1}$, and quaternized pyridine peak at 1643 cm$^{-1}$. Completion of PS treatment was confirmed via high-resolution N(1s) spectra, where the shift was observed from 398.4 eV to 401.3 eV. Therefore, FTIR and XPS analyses confirmed successful syntheses of amphiphilic copolymers with incorporation of zwitterionic moieties.

Figure 16D:
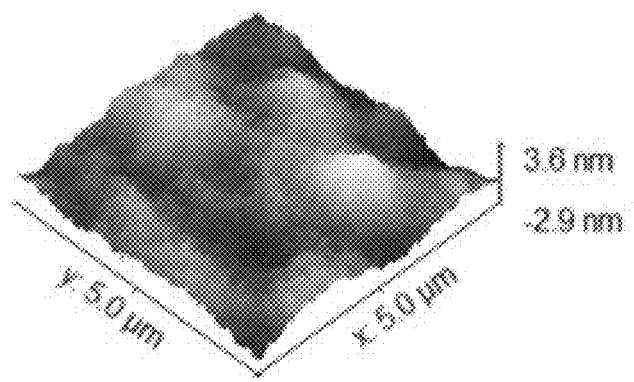
Figure 16E:
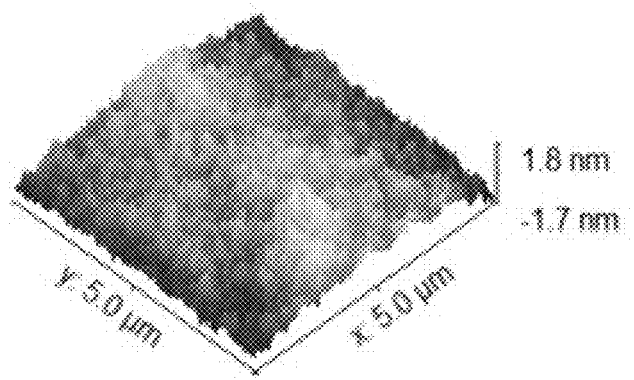
Figure 16F:
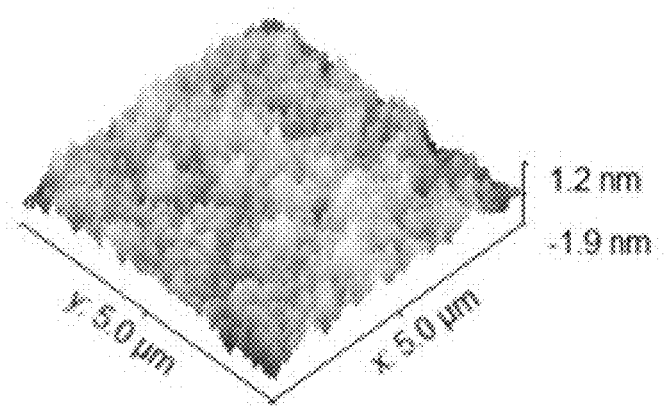

To evaluate topography and surface roughness, AFM was used to scan 5×5 μm field of zwitterionic samples. According to FIGS. 16D-F, all samples had roughness <1 nm confirming ultra-smoothness of copolymer thin films, which was the first time to see extremely smooth amphiphilic copolymers produced via iCVD. In the previous studies, the lowest roughness was 21.6 nm for 4VPz-PFDA, and 2-5 nm for HEMA-PFDA. The uniformity of the 4VPz-HFBA and 4VPz-PFOA could be explained by absence of crystallinity of hydrophobic monomers and easier mixing of hydrophobic and hydrophilic monomers due to reduced hydrophobicity of short perfluorinated chains. In addition, having lower surface roughness is beneficial for enhancement of antifouling performance because higher surface roughness leads to increase adhesion strength of marine organisms.

Lastly, to confirm insolubility of zwitterionic and amphiphilic coatings, the samples were incubated in Milli-Q water over period of 8 hours, and the polymer thin film thickness before and after the incubation was measured by using ellipsometry. The results are summarized in Table 6. The thickness change was below 10% for each sample. Interestingly, for 4VPz-HFBA, which had a short hydrophobic chain, a higher change of 9.0% was observed compared to 4VPz-PFOA, which had 6.5% due to longer hydrophobic side chain. Thus, AFM measurements and incubation experiments showed formation of ultra-smooth, stable, and insoluble zwitterionic and amphiphilic thin films.

TABLE 6

Insolubility of zwitterionic and amphiphilic coatings.

| Copolymer | Thickness Before (nm) | Thickness After [nm] | % Difference |
|---|---|---|---|
| 4VPz-DVB | 245.1 | 224.5 | 8.4 |
| 4VPz-HFBA | 371.8 | 338.3 | 9.0 |
| 4VPz-PFOA | 382.3 | 357.5 | 6.5 |

The sample thickness before and after 8-hour incubation in Milli-Q water at 37° C.

Antifouling Performance at Solid-Liquid-Air Interface

Figure 17A:
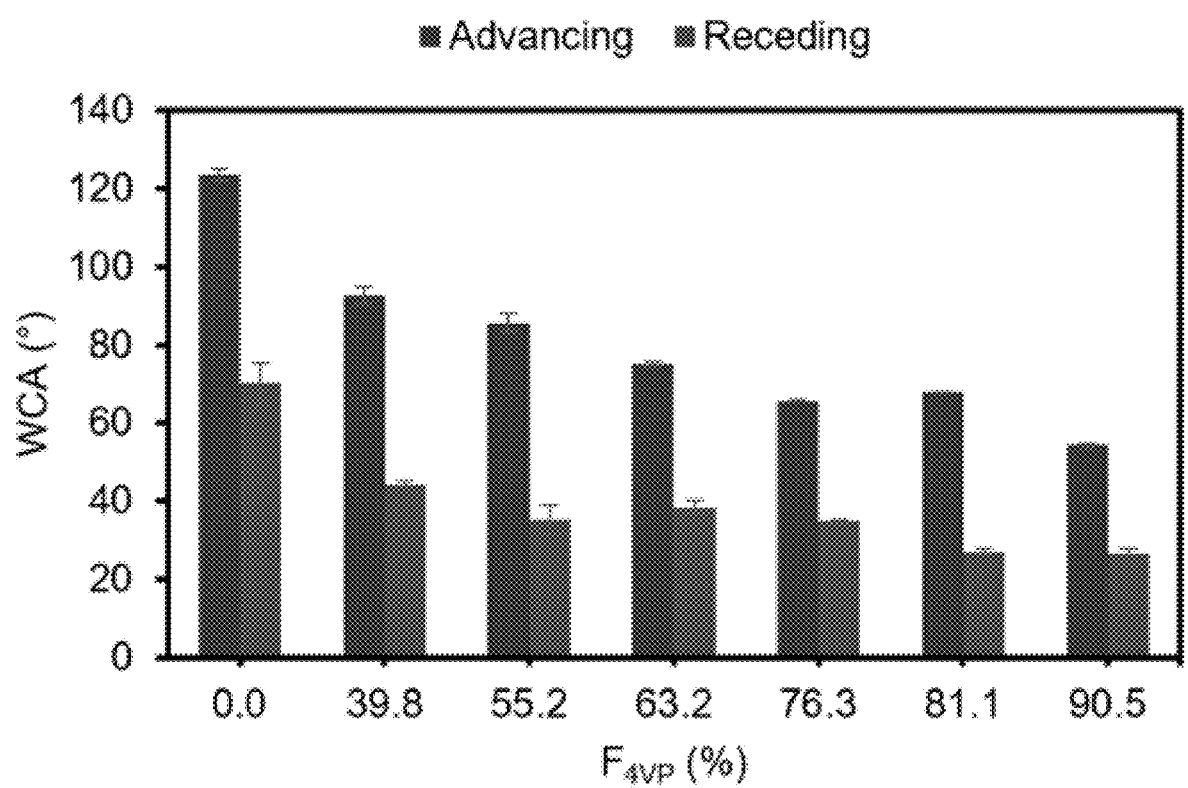
FIGS. 17A-C show behavior of biofilm at liquid-solid-air interface. Advancing and receding water contact angle measurements for (FIG. 17A) PHFBA and 4VP-HFBA copolymers.
Figure 17B:
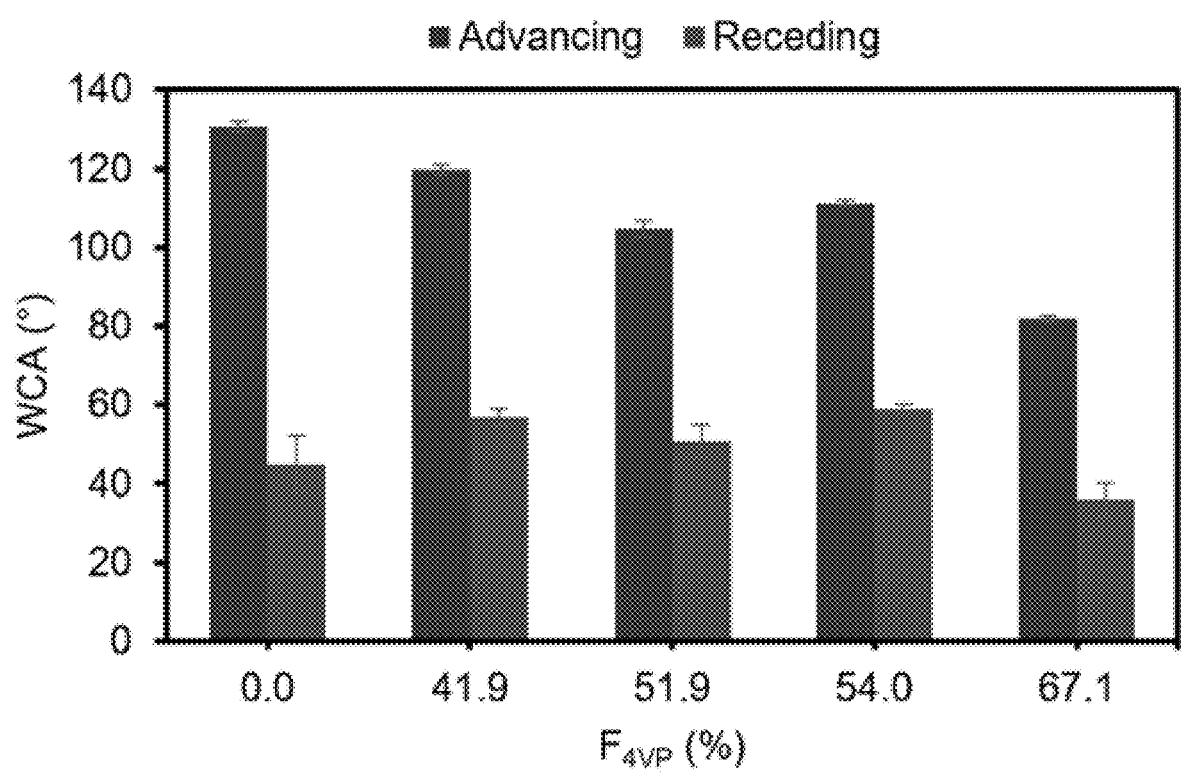

The amphiphilic nature of 4VP-HFBA and 4VP-PFOA copolymers was explored via dynamic water contact angle measurements. FIG. 17A depicts advancing and receding water contact angle (WCA) for 4VP-HFBA thin films with various film composition. The homopolymer of HFBA had an advancing contact angle of 123.6±1.5° with receding angle of 70.0±5.5°, confirming the hydrophobicity of HFBA with significant hysteresis of 53.6°. Such a large hysteresis could be explained by the reorganization of fluorinated groups when wetted at the water interface and exposure of the carbonyl groups due to absence of crystallinity. With the increase of 4VP the advancing WCA decreased from 92.8±2.1° to 54.3±0.4° due to presence of more hydrophilic domains. The receding contact angle dropped to 44.3±0.8° for sample with F$_{4VP}$ of 39.8%, and the receding WCA was below 400 for other samples. Large advancing WCA and low receding WCA confirmed the amphiphilic nature of the synthesized 4VP-HFBA copolymers, which changed their orientation based on the environment, i.e., hydrophobic for liquid-air interface and hydrophilic for liquid-solid interface. Similarly, FIG. 17B shows dynamic WCA measurement for 4VP-PFOA copolymers with varying film composition. The homopolymer of PFOA had an advancing WCA of 130.7±1.2°, which was slightly larger than PHFBA due to longer perfluorinated chain. The receding WCA was 45.0±7.3° that led to the hysteresis of 85.7°, which could be explained by even larger chain reorientation than PHFBA. With the increase of 4VP, the advancing contact angle dropped from 119.8±1.2° to 82.0±0.80 and receding angle changed from 57.0±2.10 to 35.9±4.5°, respectively. Hence, amphiphilic copolymers demonstrated reduced surface reconstruction of the hydrophobic chain because the hysteresis reduced to 46.1°-62.8° range, which was below the PFOA hysteresis of 85.7°. Dynamic WCA confirmed the chain reorientation of amphiphilic copolymers based on the interface.

Figure 17C:
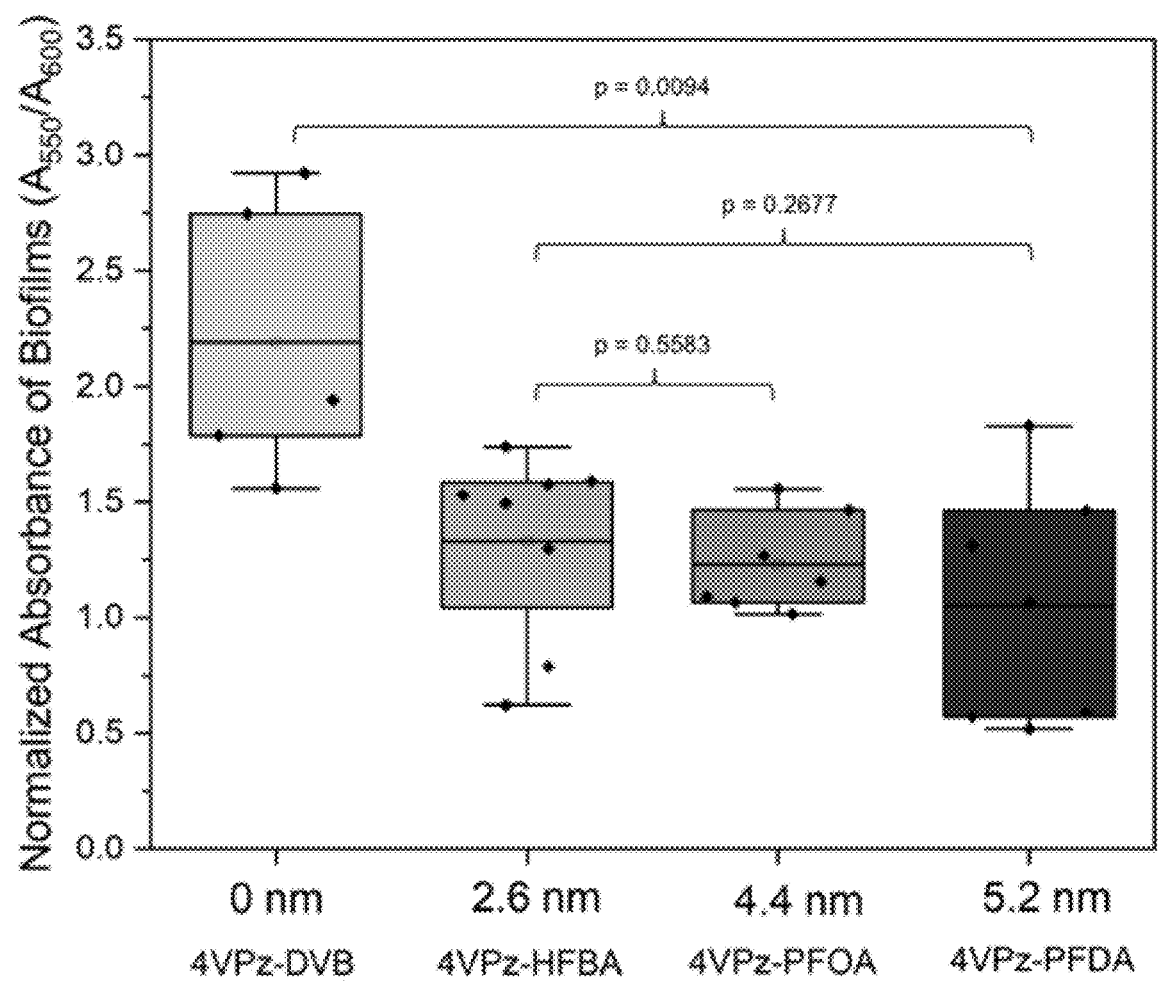

To test the performance of zwitterionic and amphiphilic thin films with respect to *P. aeruginosa*, PAO1 strain was selected because it is one of the most common strains used in the research, and it's known for its ability to grow biofilm at solid-liquid-air interface. FIG. 17C depicts the results for biofilm attachment experiments for zwitterionic 4VPz-DVB, and amphiphilic copolymers with different hydrophobic chain length: 4VPz-HFBA, 4VPz-PFOA and 4VPz-PFDA. The absorbance at 550 nm ($OD_{550}$), which is representative of the amount of biofilm growth, was normalized the absorbance at 600 nm ($OD_{600}$). The normalized ratio $OD_{550}/OD_{600}$ was further divided by $OD_{550}/OD_{600}$ of clean control glass slides to account for variations in the bacteria culture conditions, bringing the value of "1" in the box chart equivalent to the measurement of control glass slides. All amphiphilic copolymers outperformed zwitterionic chemistry with the most robust performance achieved by 4VPz-PFDA (52.1% better than 4VPz-DVB), which had the hydrophobic chain length of 5.2 nm and the highest roughness compared to other copolymers. Interestingly, both 4VPz-HFBA and 4VPz-PFOA results were not statistically different when compared to each other (p=0.5583) or when compared to 4VPz-PFDA (p=0.2677 for 4VPz-HFBA). However, overall performance got slightly worse with decrease of hydrophobic chain length: 43.8% and 39.2% for 4VPz-PFOA and 4VPz-HFBA when compared to the purely zwitterionic chemistry. Hence, it could be concluded that the chain length of fluorinated part of amphiphilic coatings did not play a big role in the antifouling performance, and it was possible to achieve similar performance with a shorter chain like HFBA.

CONCLUSION

The examples provided herein evidence that amphiphilic copolymers were synthesized by using a solvent-free vapor deposition technique, iCVD. Hence, no hazardous solvents were involved in the synthesis. 4VP-HFBA and 4VP-PFOA demonstrated random copolymerization, and no microphase separation of the copolymers was observed. All copolymer thin film coatings demonstrated excellent antifouling performance, which was not dependent on the size of the hydrophobic chain. The possibility of chain reconstruction of HFBA and PFOA was avoided through the copolymerization with 4VP, and thus reduced hysteresis of copolymers when compared to PPFOA and PHFBA. However, various embodiments still use a crosslinker during synthesis of amphiphilic copolymers with short perfluorinated chains to ensure the long-term stability of the antifouling coating.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), "contain" (and any form contain, such as "contains" and "containing"), and any other grammatical variant thereof, are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a composition or article that "comprises", "has", "includes" or "contains" one or more features possesses those one or more features, but is not limited to possessing only those one or more features.

As used herein, the terms "comprising," "has," "including," "containing," and other grammatical variants thereof encompass the terms "consisting of" and "consisting essentially of."

The phrase "consisting essentially of" or grammatical variants thereof when used herein are to be taken as specifying the stated features, integers, steps or components but do not preclude the addition of one or more additional features, integers, steps, components or groups thereof but only if the additional features, integers, steps, components or groups thereof do not materially alter the basic and novel characteristics of the claimed composition, device or method.

All publications cited in this specification are herein incorporated by reference as if each individual publication were specifically and individually indicated to be incorporated by reference herein as though fully set forth.

Subject matter incorporated by reference is not considered to be an alternative to any claim limitations, unless otherwise explicitly indicated.

Where one or more ranges are referred to throughout this specification, each range is intended to be a shorthand format for presenting information, where the range is understood to encompass each discrete point within the range as if the same were fully set forth herein.

While several aspects and embodiments of the present invention have been described and depicted herein, alternative aspects and embodiments may be affected by those skilled in the art to accomplish the same objectives. Accordingly, this disclosure and the appended claims are intended to cover all such further and alternative aspects and embodiments as fall within the true spirit and scope of the invention.

The invention claimed is:

1. An amphiphilic copolymer comprising two or more structures of formula (i)-(vi):

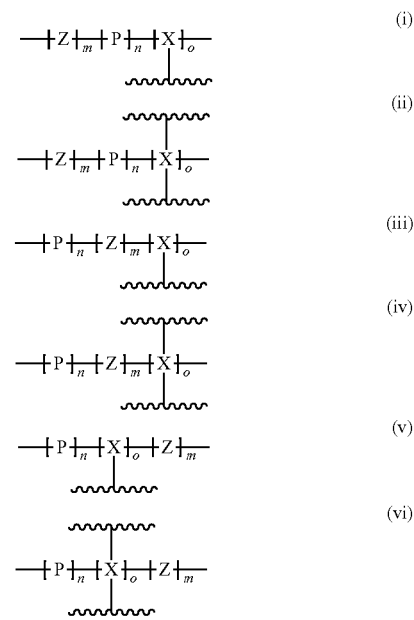

wherein

Z is a hydrophilic zwitterionic structural unit comprising at least one pendant heteroaromatic moiety, wherein the heteroaromatic moiety comprises a positively charged quaternary nitrogen atom, and wherein at least one negatively charged functional moiety is linked to the heteroaromatic moiety directly or through a linker, wherein the linker, where present, is an optionally substituted alkylene linker;

P is a hydrophobic structural unit comprising a hydrophobic moiety, said hydrophobic moiety being or comprising a linear, branched, or cyclic fluorine-substituted $C_1$-$C_{20}$ alkyl moiety;

X is a crosslinking moiety;

m is an integer that is ≥1;

n is an integer that is ≥1;

o is an integer selected from 1 to 10,000;

wherein the amphiphilic copolymer has hydrophilic zwitterionic structural units and hydrophobic structural units randomly distributed therein, and wherein the comonomer residues are located randomly in the copolymer molecule and are configured to have reversible surface chain reorientation in response to surface wetting and/or drying to switch between a first surface energy state and a second surface energy state;

wherein the amphiphilic copolymer comprises a plurality of domains having hydrophilic units and hydrophobic units, and wherein each of the domains has a size smaller than 2 nm²; and wherein the crosslinking moiety X is selected from a unit of polymerized monomer selected from arylene, alkylene, phenylene, 1,4-phenylene, divinylbenzene, ethylene glycol dimethacrylate, ethylene glycol diacrylate, vinyl methacrylate, allyl methacrylate, maleic anhydride, 1,3,5-trivinyltrimethylcyclotrisiloxane glycidyl methacrylate, and di(ethylene glycol)divinyl ether, or any combination thereof.

2. The copolymer according to claim 1, wherein the at least one negatively charged functional moiety is an oxygen atom.

3. The copolymer according to claim 1, comprising a repeat unit of formula

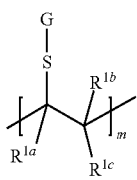

wherein

S is a heteroaryl ring having a positively charged quaternary nitrogen atom;

G is a moiety comprising the at least one negatively charged functional moiety that is linked to the heteroaromatic moiety; and $R^{1a}$, $R^{1b}$, and $R^{1c}$ are each individually selected from hydrogen, alkyl, phenyl, halo, hydroxyl, amino, nitro, and cyano.

4. The copolymer according to claim 3, wherein $R^{1a}$, $R^{1b}$, and $R^{1c}$ are each independently selected from hydrogen and alkyl.

5. The copolymer according to claim 1, comprising a repeat unit of formula

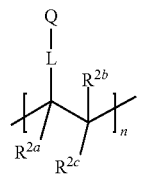

wherein

Q is the hydrophobic moiety;

L is not present or is a linking moiety; and $R^{2a}$, $R^{2b}$, and $R^{2c}$ are each individually selected from hydrogen, alkyl, phenyl, halo, hydroxyl, amino, nitro, and cyano.

6. The copolymer according to claim 5, wherein L is a linker selected from a bond, alkylene, amide, ester, ether, and disulfide moiety, or any combination thereof.

7. The copolymer according to claim 5, wherein $R^{2a}$, $R^{2b}$, and $R^{2c}$ are each independently selected from hydrogen and alkyl.

8. The copolymer according to claim 1 comprising a first repeat unit of formula (I) and a second repeat unit of formula (II):

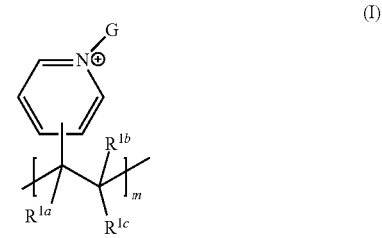

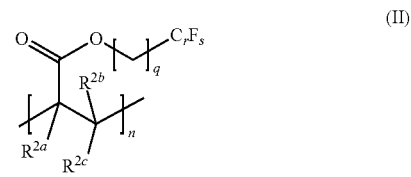

wherein:

G is a moiety comprising the at least one negatively charged functional moiety that is linked to the pyridine ring;

$R^{1a}$, $R^{1b}$, and $R^{1c}$ are each individually selected from hydrogen, alkyl, phenyl, halo, hydroxyl, amino, nitro, and cyano;

$R^{2a}$, $R^{2b}$, and $R^{2c}$ are each individually selected from hydrogen, alkyl, phenyl, halo, hydroxyl, amino, nitro, and cyano;

q is 0-4;

r≤20; and s≤41.

9. The copolymer according to claim 8, wherein the at least one negatively charged functional moiety comprises a carboxylate anion, a sulfonate anion, a phosphonate anion, or is an oxygen atom.

10. The copolymer according to claim 8, wherein the first repeat unit of formula (I) is of formula (IA):

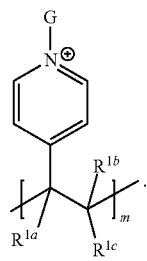

(IA)

11. The copolymer according to claim 10, wherein G is —$(CH_2)_{1-6}SO_3^-$.

12. The copolymer according to claim 11, wherein $R^{1a}$, $R^{1b}$, and $R^{1c}$ are each individually selected from hydrogen and methyl.

13. A film comprising a layer of the copolymer according to claim 1, wherein the thickness of the layer is 5 nm to 100 microns.

14. A composition comprising:
a coating material comprising a copolymer according to claim 1; and
a substrate;
wherein the substrate is coated with a layer of the coating material on at least one side.

15. An article comprising the composition of claim 14.

16. A method of:
decreasing, reducing, or inhibiting microorganism growth, or killing or denaturing a microorganism, or inhibiting biofilm formation; or
controlling bacteria growth on a substrate;
said method comprising applying a layer of the copolymer according to claim 1 on a substrate.

17. The method according to claim 16, wherein applying the layer of the copolymer on the substrate comprises:
placing the substrate in an iCVD reactor under vacuum condition;
flowing into the reactor in parallel or in sequence a plurality of materials comprising:
an inert carrier gas;
an initiator;
a first monomer that is the source of the at least one pendant heteroaromatic moiety in the

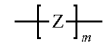

repeat units;
a second monomer that is the source of the

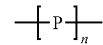

repeat units; and
a crosslinker,
thereby forming a polymeric layer on at least one side of the substrate via iCVD; and
exposing the polymeric layer to a negatively charged functional moiety, thereby forming the layer of the copolymer on the substrate.

18. The amphiphilic copolymer of claim 1, wherein the amphiphilic copolymer has a contrast in comonomer surface energies of at least 48 mN m$^{-1}$ as between hydrophilic and hydrophobic components therein.

19. The amphiphilic copolymer of claim 1, wherein the amphiphilic copolymer has a contrast in comonomer surface energies of at least 58 mN m$^{-1}$ as between hydrophilic and hydrophobic components therein.

20. The amphiphilic copolymer of claim 1, wherein the amphiphilic copolymer has a receding contact angle of less than 40 degrees.

21. The amphiphilic copolymer of claim 1, wherein a static contact angle of the amphiphilic copolymer is configured to change over time during the reversible surface chain reorientation.

22. A layer of the copolymer according to claim 1, wherein the layer has an RMS surface roughness of 35 nm or less.

* * * * *